United States Patent
Ohara et al.

(10) Patent No.: US 6,529,618 B1
(45) Date of Patent: Mar. 4, 2003

(54) RADIATION IMAGE PROCESSING APPARATUS

(75) Inventors: Hiromu Ohara, Hino (JP); Kouji Amitani, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/385,558

(22) Filed: Aug. 30, 1999

(30) Foreign Application Priority Data

Sep. 4, 1998 (JP) .......................... 10-251445
Oct. 22, 1998 (JP) .......................... 10-301391
Oct. 22, 1998 (JP) .......................... 10-301392

(51) Int. Cl.[7] .............................................. G06K 9/00
(52) U.S. Cl. ...................................... 382/132; 382/141
(58) Field of Search ................................ 382/132, 159, 382/141, 142, 143, 144, 145, 140; 378/62, 37; 250/484.4, 584, 582

(56) References Cited

U.S. PATENT DOCUMENTS 5,157,733 A * 10/1992 Takeo et al. ................ 382/132
5,432,354 A * 7/1995 Ohara ......................... 250/582
5,732,121 A * 3/1998 Takeo et al. .................. 378/62

* cited by examiner

*Primary Examiner*—Jayanti K. Patel
*Assistant Examiner*—Seyed Azarian
(74) *Attorney, Agent, or Firm*—Frishauf, Holtz, Goodman & Chick, P.C.

(57) ABSTRACT

A radiation image processing apparatus is provided with a defect detecting device to receive first image data from a sensor which comprises plural elements arranged two-dimensionally, converts irradiated radiation into electric image signals by the plural elements and outputs image data in which each element outputs an image datum of a single pixel, the defect detecting device to detect an image defect in the first image data and to produce defect information indicating a position of the image defect; a memory to store the defect information; and a correcting device for receiving second image data outputted from the sensor on a condition that the sensor is irradiated with radiation passing through an object, for correcting the second image data on the basis of the defect information read out from the memory, and for producing third image data.

44 Claims, 12 Drawing Sheets

P (c.d)

(SDC)

(H SDC)

BEFORE CORRECTION — AFTER CORRECTION

IMAGE DEFECT (WHITE INDICATION)

IMAGE DEFECT (BLACK INDICATION) — AFTER CORRECTION

RADIATION IMAGE PROCESSING APPARATUS

BACKGROUND OF THE INVENTION

This invention relates to a radiation image processing method and a radiation image processing apparatus.

Heretofore, an apparatus for reading a radiation image capable of obtaining a radiation image for diagnosis of disease has been known. In this radiation image reading apparatus, it is used, for example, a stimulable phosphor sheet wherein stimulable phosphor material, which stores a part of radiation energy and later, when an exiting light such as a visible light is applied, exhibits stimulated emission of light in accordance with the stored energy, is processed to make a sheet. In an apparatus using this stimulable phosphor sheet, radiation image information of an object to be radiographed is recorded by applying a radiation transmitted through the object to the stimulable phosphor sheet, and by condensing and converting it into an electrical signal by a photoelectric element the stimulated emission of light obtained by application of a laser light or the like to the stimulable phosphor sheet in which the information has been recorded, image data of a radiation image based on this electrical signal are generated. Further, it is also used an apparatus wherein image data are generated on the basis of an electrical signal which is generated in accordance with the dose of the applied radiation by two-dimensionally arranged plural detective elements which is called a Flat Panel Detector (an FPD).

However, in the FPD, wherein a plurality of detective elements are arranged two-dimensionally, the signal level (signal value) for the dose of applied radiation is not uniform for all the detective elements, and in some cases it is included a detective element such as a damaged element or an inferior element which makes the signal level different from the level of other elements, that is, an abnormal level, (hereinafter referred to as 'a defective pixel'). In cases where such a defective pixel is included, because an image defect is produced in the image data based on the signal read from the image sensing panel, sometimes proper diagnosis is disturbed in reading the photographed image for diagnosing a disease.

SUMMARY OF THE INVENTION

Therefore, the first object of this invention is to provide a radiation image processing method and a radiation image processing apparatus wherein a satisfactory radiation image can be obtained even if an image defect is produced in the image data.

Further, if correction has been done when an image defect was produced, the position for which the correction has been made can not be discriminated from the image data after correction; hence, it is impossible to confirm the position for which correction has been done.

Therefore, it is another object of this invention to provide a radiation image processing apparatus capable of obtaining a radiation image which is satisfactory and easy to observe even in the case where an image defect has been produced, and also capable of easily discriminating the position of the image defect.

Further, image defects sometimes increase; hence, correction can not be precisely done if the increase of image defects and the positions of the image defects are not grasped precisely.

Accordingly, it is a further object of this invention to provide a radiation image processing apparatus capable of correctly detecting that an image defect has been produced newly and easily discriminating the image defect.

The above objects can be attained by the following structure and the following method.

A radiation image processing apparatus, comprises:
a defect detecting device to receive first image data from a sensor which comprises plural elements arranged two-dimensionally, converts irradiated radiation into electoric image signals by the plural elements and outputs image data in which each element outputs an image datum of a single pixel, the defect detecting device to detect an image defect in the first image data and to produce defect information indicating a position of the image defect;
a memory to store the defect information; and
a correcting device for receiving second image data outputted from the sensor on a condition that the sensor is irradiated with radiation passing through an object, for correcting the second image data on the basis of the defect information read out from the memory, and for producing third image data.

A radiation image processing apparatus, comprises:
a sensor in which plural elements are arranged two-dimensionally, to convert irradiated radiation into electoric image signals by the plural elements and to output image data in which each element outputs an image datum of a single pixel;
a defect detecting device to receive first image data from the sensor, to detect an image defect in the first image data, and to produce defect information indicating a position of the image defect;
a memory to store the defect information;
a defect comparing device to compare predetermined first defect information with second defect information based on new defect information newly produced by the defect detecting device; and
a warning device to make warning.

A radiation image processing apparatus, comprises:
a sensor in which plural elements are arranged two-dimensionally, to convert irradiated radiation into electoric image signals by the plural elements and to output image data in which each element outputs an image datum of a single pixel;
a defect detecting device to receive first image data from the sensor, to detect an image defect in the first image data, and to produce defect information indicating a position of the image defect;
a memory to store the defect information;
a defect comparing device to compare predetermined first defect information with second defect information based on new defect information newly produced by the defect detecting device; and
the memory renewing the stored defect information based on the comparison result by the defect comparing device.

A radiation image processing method, comprises steps of:
producing first image data by a sensor which comprises plural elements arranged two-dimensionally, converts irradiated radiation into electoric image signals by the plural elements and outputs image data in which each element outputs an image datum of a single pixel;
producing defect information indicating a position of the image defect by detecting an image defect in the first image data;

producing second image data by the sensor on a condition that the sensor is irradiated with radiation passing through an object, and producing third image data by correcting the second image data on the basis of the defect information.

Further, the above objects can be attained by the following preferable structure and the following preferable method.

The radiation image processing method of this invention is a method wherein an output signal is obtained from two-dimensionally arranged plural radiation detecting elements with each of the radiation detecting elements made as one pixel, and an image defect is detected from first image data produced on the basis of the output signal, while a defect information showing the position of the detected image defect is generated, and the image data of the image defect shown by the defect information in second image data generated by applying the radiation transmitted through an object to be radiographed to the plural radiation detecting elements are corrected.

Further, the radiation image processing apparatus is an apparatus comprising defect detecting means which detects an image defect from first image data produced on the basis of an output signal obtained from two-dimensionally arranged plural radiation detecting elements with each of the radiation detecting elements made one pixel and generates the defect information showing the position of the detected image defect, defect information memorizing means which memorizes the defect information generated by the defect detecting means, and defect correcting means which corrects the image defect in second image data produced by applying the radiation transmitted through an object to be radiographed to the plural radiation detecting elements on the basis of defect information memorized in the defect information memorizing means.

In this invention, at least one out of image data produced without application of radiation, image data produced by applying radiation uniformly, and image data produced by applying the radiation transmitted through an object to be radiographed is taken for the first image data. Further, image data subjected to trend removal is taken for the first image data.

Now, the defect information showing the pixel position of the detected image defect is generated through carrying out any one detecting process or plural detecting processes out of the following: a detecting process wherein a first threshold value and a second threshold value which is higher than the first is determined, and if signal level of a pixel in the first image data is lower than the first threshold value or higher than the second threshold value, this pixel is judged as an image defect, a detecting process wherein a pixel in the first image data is judged as an image defect if signal level of the pixel is different from the average signal level of the surrounding pixels by an amount not less than a predetermined value, a detecting process wherein average signal level of image data across a predetermined number of lines taken in the longitudinal or lateral direction is used as the first image data, and if the average level is lower than the first threshold value or higher than the second threshold value, the pixels across the predetermined number of lines are judged as image defects, and detecting process wherein average signal level of image data across a predetermined number of lines taken in the longitudinal or lateral direction is used as the first image data, and if the average level is different from the average level of the surrounding pixels by an amount not less than a predetermined value, the pixels across the predetermined number of lines are judged as image defects. For the second image data produced by applying the radiation transmitted through an object to be radiographed to the plural radiation detecting elements, the correction of an image defect is performed in a manner such that the image data of the image defect is substituted, for example, by the average level of the image data of the normal pixels surrounding the defective pixel.

A radiation image processing apparatus of this invention comprises image data generating means for generating image data on the basis of an output signal from a plurality of radiation detective elements which are arranged two-dimensionally, image defect detecting means for detecting an image defect by using first image data generated by said image data generating means and generating defect information indicating the position of the detected image defect, defect information memorizing means for memorizing the defect information generated by said image defect detecting means, and image defect correcting means for correcting the image defect of second image data generated by applying the radiation having been transmitted through a photographic object to said plurality of radiation detective elements and generating third image data, said radiation image processing apparatus further comprising image data processing means for processing said second image data and said third image data as a unit of image data.

Further, the radiation image processing apparatus further comprises image display means and image data supplying means for supplying image data to said image display means, wherein said image data supplying means supplies either the second image data or the third image data alternately by switching to said image display means, or supplies both of them to said image display means, and a radiation image based on the image data supplied from said image data supplying means is displayed on said image display means.

Furthermore, said radiation image processing apparatus further comprises image data outputting means, wherein both the second image data and the third image data are processed in such a manner as to become capable of being outputted to a sheet of medium and outputted to it.

In this invention, the image data before correction for image defects and the image data after correction for the defects are processed as a pair of data, and a radiation image before correction and the radiation image after correction are simultaneously or alternately displayed on the basis of these image data having been made to be a pair. Further, the image data having been made to be a pair are outputted together. Further, by using information indicating the positions of image defects instead of the image data before correction or the image data after correction, a display indicating the positions of image defects or the information indicating the positions of image defects is carried out. In this case, for example, in the case where the number of pixels of the display means for displaying the radiation image is smaller than the number of pixels of the image data to be displayed, the image data are thinned in such a manner as to have a minimum number of image defects. Further, in an external apparatus in which the image data are outputted to a sheet of medium as a radiation image, in the case where the number of pixels to be able to be outputted to a sheet of medium is smaller than the number of pixels of the image data, the image data which are thinned in such a manner as to have a minimum number of image defects in accordance with this external apparatus are outputted from the radiation image processing apparatus to the external apparatus.

A radiation image processing apparatus of this invention comprises image data generating means for generating image data on the basis of an output signal from a plurality of radiation detective elements which are arranged two-dimensionally, defect detecting means for detecting an image defect by using first image data generated by said image data generating means and generating defect information indicating the position of the detected image defect, defect information memorizing means for memorizing the defect information generated by said defect detecting means, defect comparing means for comparing a predetermined first defect comparing information with a second defect comparing information of image defects based on the defect information which is newly generated in said defect detecting means, and notifying means for issuing a warning on the basis of the result of comparison in said defect comparing means. The radiation image processing apparatus further comprises display means; the positions of image defects based on the defect information generated newly in the defect detecting means are displayed on the display means, and when it has been judged that the defect positions of the second defect comparing information include new defect positions which are different from the defect positions of the image defects based on the defect information memorized in said defect information memorizing means, also the new defect positions which are different from the defect positions of the first defect comparing information are displayed by marking.

Further, the radiation image processing apparatus comprises image data generating means for generating image data on the basis of an output signal from a plurality of radiation detective elements which are arranged two-dimensionally, defect detecting means for detecting an image defect by using first image data generated by said image data generating means and generating defect information indicating the position of the detected image defect, defect information memorizing means for memorizing the defect information generated by said defect detecting means, defect comparing means for comparing a predetermined first defect comparing information with a second defect comparing information of image defects based on the defect information which is newly generated in said defect detecting means, and in said defect information memorizing means, the defect information memorized is renewed on the basis of the result of comparison by said defect comparing means.

In this invention, in photographing a radiation image, for example, a maximum allowable number of image defects is set as the first defect comparing information, and this first defect comparing information is compared with the number of defects of the second defect comparing information of the image defects based on the defect information which has been newly generated by the defect detecting means. In this case, in the case where the number of defects of the second defect comparing information is larger than the number of defects of the first defect comparing information, a warning that the number of defects has exceeded the maximum allowable number of defects is issued by the notifying means by a voice etc. Further, when the number of image defects based on the information memorized in the defect information memorizing means is set as the first defect comparing information, and the number of image defects of the second defect comparing information has exceeded the number of defects of the first defect comparing information, or when it exceeds the number of image defects of the first defect comparing information by more than a predetermined value, a warning notifying the above is issued and the defect information which has been newly generated by the defect detecting means is substituted for the defect information memorized in the defect information memorizing means, or is added to it.

Further, when the positions of image defects based on the defect information memorized in the defect information memorizing means are set as the first defect comparing information, and it has been judged that the defect positions of the second defect comparing information include a new defect position which is different from any one of the defect positions of the first defect comparing information, a warning notifying the above is issued and the defect information which has been newly generated by the defect detecting means is substituted for the defect information memorized in the defect information memorizing means, or is added to it.

Furthermore, on the basis of the renewed defect information in the defect information memorizing means, correction of the image data is done by defect correcting means.

DETAILED DESCRIPTION OF THE PREFERRED EMBODIMENT

"THE FIRST EMBODIMENT"

Figure 1:
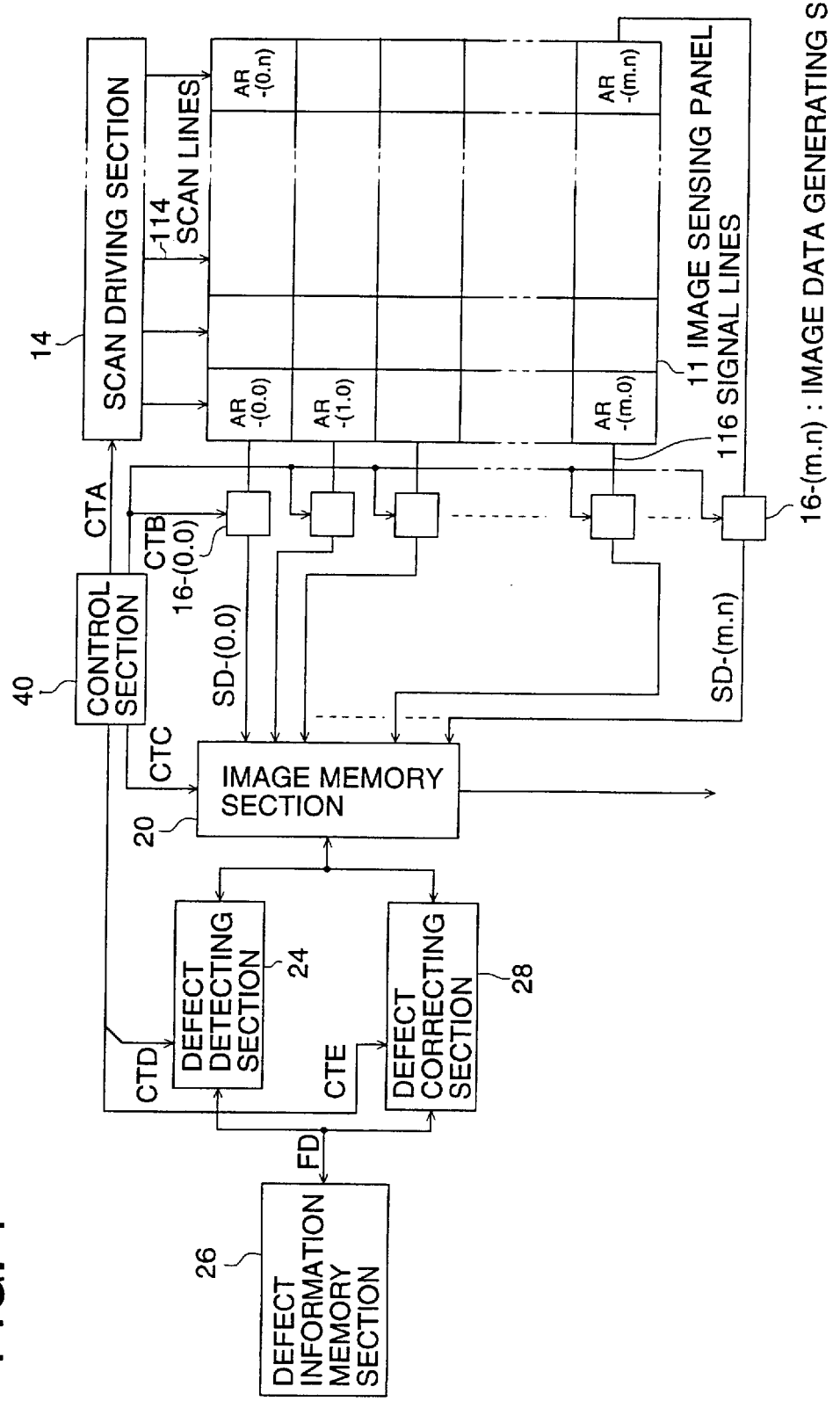
FIG. 1 is a drawing showing the structure of a radiation image processing apparatus of this invention.
Figure 2:
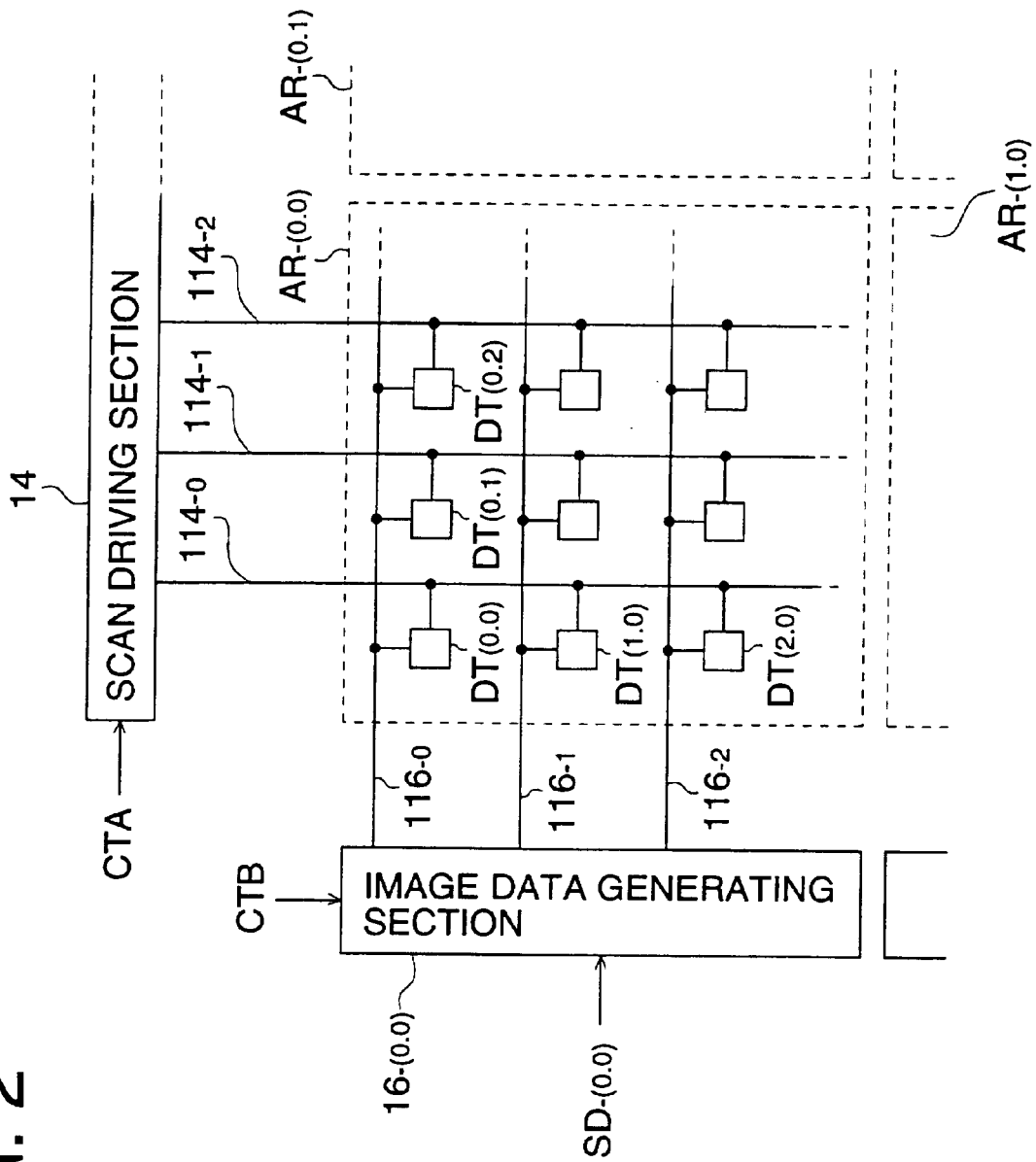
FIG. 2 is a drawing showing the block AR-(0, 0)

In the following, an example of the embodiment of this invention will be explained in detail with reference to the drawings. The radiation outputted from a radiation generator in order to obtain a radiation image of an object to be radiographed is applied to the image sensing panel 11 used as a sensor of the image processing apparatus through the object to be radiographed. The sensing area of the image sensing panel 11 is divided into a plurality of blocks AR-(0, 0) to AR-(m, n) as shown in FIG. 1. In one block, for example the block AR-(0, 0), as shown in FIG. 2, the detective elements DT(0, 0) to DT(j, k) which output an electrical signal in accordance with the dose of the applied radiation are arranged two-dimensionally, while the scan lines 114-0 to 114-k and the signal lines 116-0 to 116-j are arranged, for example, in an orthogonal way.

The scan lines 114-0 to 114-k are connected to the scan driving section 14, in which the readout signal RS is generated on the basis of the control signal CTA supplied from the control section 40 to be described later, the readout signal RS being outputted to the scan line 114-p (p being one of the values from 0 to k), which is one of the scan lines 114-0 to 114-k. By this readout signal RS, the electrical signals SV-0 to SV-j corresponding to the dose of the applied radiation are outputted from the detective elements DT(0, p) to DT(j, p) connected to the scan line 114-p, and are supplied to the image data generating section 16-(0, 0) through the signal lines 116-0 to 116-j.

In the other blocks AR-(0, 1) to AR-(0, n), AR-(1, 0) to AR-(1, n), - - - , AR-(m, n) also as in the block AR-(0, 0), the electrical signals SV corresponding to the dose of the applied radiation are outputted by the readout signal RS from the scan driving circuit 14 from the (j×k) detective elements in each block, and are supplied to the image data generating sections corresponding to the respective blocks 16-(0, 1) to 16-(0, n), 16-(1, 0) to 16-(1, n), - - - , 16-(m, n).

Further, if the scan lines 114-0 to 114-k, which are used for the block A-(0, 0), are used also for other blocks in the same way as for the block AR-(0, 0), the electrical signals SV can be outputted in a simple way in the same timing from the detective elements of the respective blocks having the same row number for example.

For the detective elements DT described in the above, any one that can output an electrical signal in accordance with the dose of the applied radiation may be employed. For example, in the case where the detective elements are formed by using a photoconductive layer which has its resistance value varied with the generation of the electron-hole pairs when it is irradiated, electric charge of an amount corresponding to the dose of the radiation generated in the photoconductive layer is stored in a charge accumulating capacitor, and this electric charge stored in the charge accumulating capacitor is supplied to the image data generating section 16 as an electrical signal. Further, as for the photoconductive layer, one having a high dark resistivity value is desirable; hence, amorphous selenium, lead oxide, cadmium sulfide, mercuric iodide, or an organic material exhibiting photoconductivity (including a photoconductive polymer with an X-ray absorbing compound added) is used, and amorphous selenium is especially desirable.

On the other hand, in the case where the detective elements are formed, for example, by using a scintillator, which emits fluorescent light by the application of radiation or the like, it may be appropriate that an electrical signal based on the strength of the fluorescent light produced by this scintillator is generated in a photodiode and is supplied to the image data generating section 16. Further, as for the scintillator, $Gd_2O_2S$:Tb, MX:Tl (M=Rb, Cs; X=Cl, Br, I), BaFX:Eu (X=Cl, Br, I), LaOBr:A (A=Tb, Tm), $YTaO_4$, [Y, Sr]$TaO_4$:Nb, and $CaWO_4$, and so forth are used, and among them, $Gd_2O_2S$:Tb, CsI:Tl, and BaFCl:Eu are especially desirable.

Any one of the detective elements of the image sensing panel 11 corresponds to one pixel, and in the image data generating section 16-(0, 0), the supplied electrical signals SV-0 to SV-j are successively selected and converted into the digital image data SD-(0, 0) on the basis of the control signal CTB supplied from the control section 40. Further, in the image data generating sections 16-(0, 1) to 16-(0, n), 16-(1, 0) to 16-(1, n), - - - , 16-(m, n) also in the same way, the image data SD-(0, 1), to SD-(0, n), SD-(1, 0) to SD-(1, n), - - - , SD-(m, n) are generated. The image data for one field (one image) SD-(0, 0) to SD-(m, n) generated in the image data generating sections 16-(0, 0) to 16-(m, n) are written in the image memory section 20 on the basis of the control signal CTC from the control section 40.

The defect detecting section 24 and the defect correcting section 28 are connected to this image memory section 20, and in the defect detecting section 24, detection of the image data from the detective elements whose electrical signal SV has a different signal level to the signal level from the other detective elements, that is, the detection of an image defect is carried out. Thus, when an image defect is detected in the defect detecting section 24, the information showing the position of the image defect is generated and it is memorized in the defect information memory section 26.

Further, in the defect correcting section 28, when the image data SD, which are produced by the application of radiation to an object to be radiographed, are written in the image memory section 20 on the basis of the control signal CTE from the control section 40, the image data of image defects in the image memory section 20 are corrected by using the information FD indicating the positions of the image defects memorized in the defect information memory section 26.

After that, when the correction of the image defects is completed for the image data SD written in the image memory section 20, the image data for which correction has been completed are read out and outputted from the image memory section 20 on the basis of the control signal CTC from the control section 40.

In the control section 40, the control signals CTA-CTE for carrying out the following operations are generated: the initializing operation to discharge the stored electric charge from the charge accumulating capacitors of the image sensing panel 11 before the application of radiation, the process of writing the image data in the image memory section 20 through reading out the electric charge which has been stored in the charge accumulating capacitors in accordance with the radiation applied to the image sensing panel 11, and the detecting and correcting operation for the image defects.

In the following, the method of detecting an image defect in the defect detecting section 24 and the method of correcting an image defect in the defect correcting section 28 will be explained.

In detecting an image defect, the initializing operation for discharging the stored electric charge from the charge accumulating capacitors of the image sensing panel 11 is carried out, and the detection of an image defect is performed, by using the image data which are generated in the condition of no application of radiation and are written in the image memory section 20 (hereinafter referred to as 'the not-irradiated image data SDA'), the image data which are generated by the application of uniform radiation after practicing the initializing operation and are written in the image memory section 20 (hereinafter referred to as 'the uniformly-irradiated image data SDB'), or the image data generated by the application of the radiation through an object to be radiographed after practicing the initializing operation and are written in the image memory section 20 (hereinafter referred to as 'the through-an-object-irradiated image data SDC').

Figure 3:
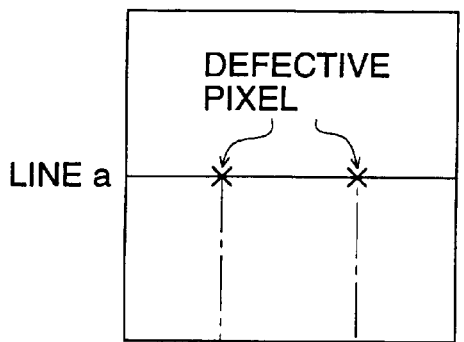
FIGS. 3(A) and 3(B) are drawings for illustrating the first method of detecting a defective pixel.
Figure 3:
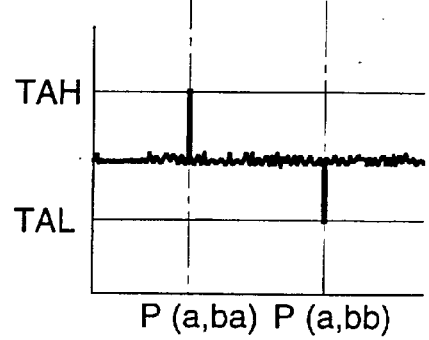

FIG. 3 is a drawing for illustrating the first method of detecting an image defect. FIG. 3A shows the image data for one field written in the image memory section 20; the image data are successively read out, for example, in lateral direction from this image memory section 20, and the detection of an image defect is carried out by comparing the data with the threshold values TAH and TAL as shown in FIG. 3B.

Figure 4:
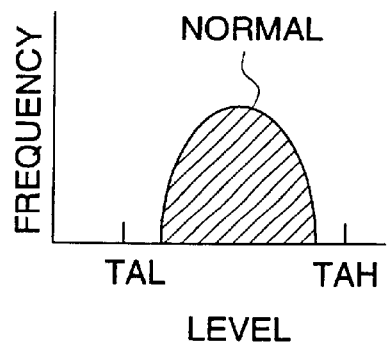
FIG. 4 is a drawing for illustrating a method of determining a threshold value.

The threshold values TAH and TAL are determined on the basis of the histogram of the image data, as shown in FIG. 4 for example. In the case where the distribution of the normal image data becomes a distribution shown by the oblique line part in FIG. 4, the threshold value for the low level region TAL is determined to a lower value than the normal image data distribution, while the threshold value for the high level region TAH is determined to a higher value than the normal image data distribution. Thus, the pixel P(a, ba) whose image data level becomes higher than threshold value TAH for the high level region or the pixel P(a, bb) whose image data level becomes lower than the threshold value TAL for the low level region is judged as a defective pixel which produces an image defect, and the information on the position of the pixel P(a, ba) or the pixel P(a, bb) is memorized in the defect information memory section 26 as the information indicating the position of an image defect.

Figure 5:
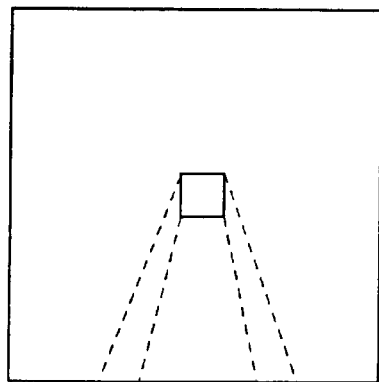
FIGS. 5(A) and 5(B) are drawings for illustrating the second method of detecting a defective pixel.
Figure 5:
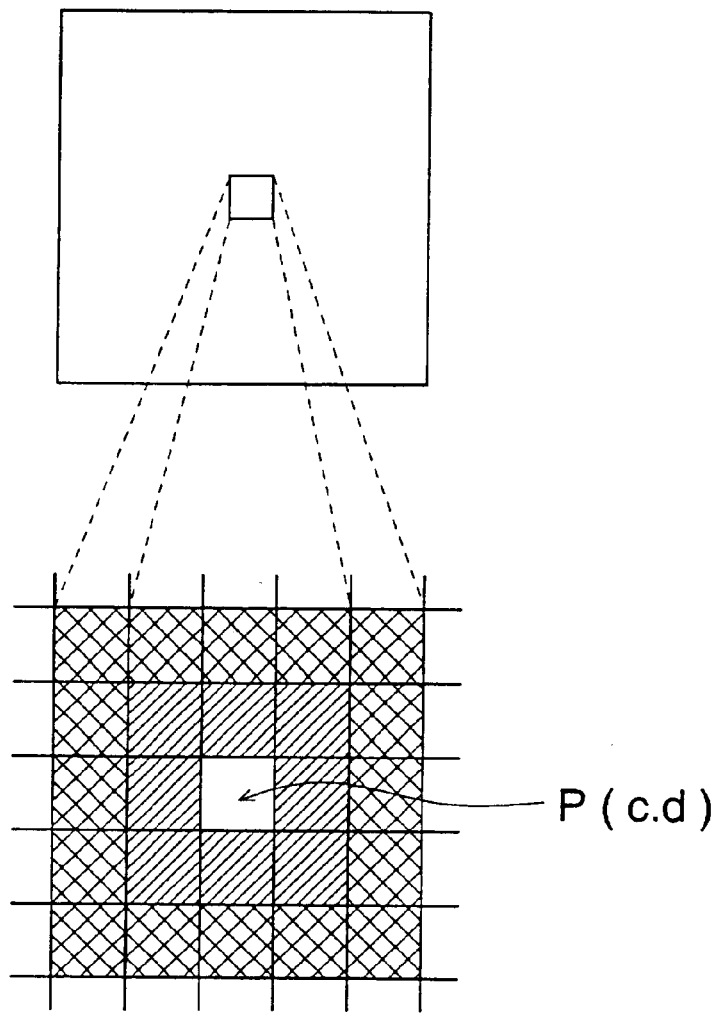

FIG. 5 is a drawing for illustrating the second method of detecting an image defect. FIG. 5A shows the image data for one field written in the image data memory section 20; for the pixel P(c, d) for which judgement concerning the generation of an image defect is performed, the average level of the image data MD(c, d) of the surrounding eight pixels shown by the oblique lines in FIG. 5B is obtained, and it is carried out the judgement whether the image data SD(c, d) of the pixel P(c, d) is within the predetermined range (from [MD(c, d)−W] to [MD(c, d)+W]) with regard to the average level MD(c, d) or not. Thus, when the image data SD(c, d) is not within the predetermined range (from [MD(c, d)−W] to [MD(c, d)+W]), the pixel P(c, d) is judged as a defective pixel generating an image defect, and the information indicating the position of the image defect, that is, the position of the pixel P(c, d) is memorized in the defect information memory section 26. Further, the image data of the pixels to be used for calculating the average level are not limited to the image data of the eight pixels in the portion shown by the oblique lines, but the image data of 24 pixels including the portion shown by hatching may be used for example. Moreover, 'W' can be determined arbitrarily within the range whereby image defects can be detected without detecting the level fluctuation (depending on the noise etc.) which the original image data have.

Incidentally, in the first and second methods of detecting an image defect described in the above, the judgement concerning the image defect is carried out for each of the pixels; however, in the case where the level difference between the image data of a defective pixel and the image data of a normal pixel is not large enough, it is difficult to judge if the level difference occurs owing to the fluctuation or to the image defect. Therefore, a method which can detect an image defect in the case where the image defect is line-shaped, even though the level difference between the image data of a defective pixel and the image data of a normal pixel is not large enough will be explained as the third method of detecting an image defect.

Figure 6:
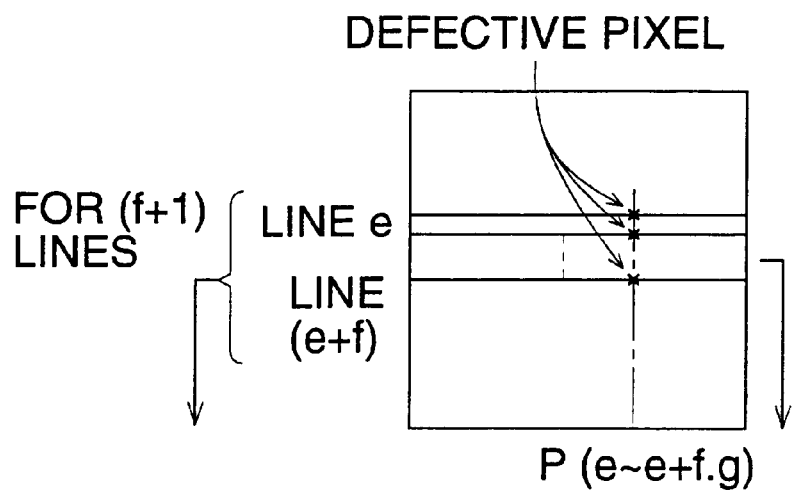
FIGS. 6(A), 6(B) and 6(C) are drawings for illustrating the third method of detecting a defective pixel.
Figure 6:
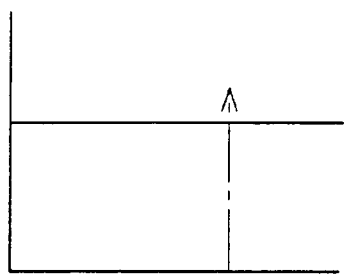
Figure 6:
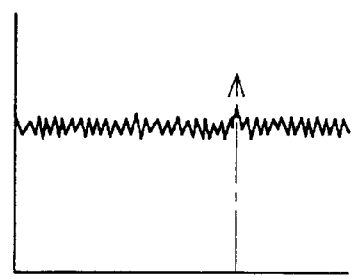

FIG. 6 is a drawing for illustrating the third method of detecting an image defect. FIG. 6A shows the image data for one field written in the image memory section 20, and by reading out the image data of plural lines which are adjacent to one another in longitudinal direction or in lateral direction from the above-mentioned image data for one field, the average level in the direction perpendicular to the direction of readout can be obtained. The average level obtained in this way is compared with the threshold values as in the above-described first method of detecting an image defect to carry out the detection of an image defect.

For example, as shown in FIG. 6A, the image data for (f+1) lines in lateral direction from the line e to the line (e+f) are read out from the image memory section 20, and the average level for each column of pixels in longitudinal direction is calculated; thus, as shown in FIG. 6B, the image data for one line as the average of the image data for (f+1) lines can be calculated. Now, in the case where the image defect is line-shaped in longitudinal direction, the amount of fluctuation in the signal level of the image data of the normal pixels can be made small by calculating the average level, even though the level difference between the image data of the defective pixels and the image data of the normal pixels is not large enough. Therefore, for an image defect of the pixel P(e+h, g) which is difficult to detect from the image data of only one line as shown in FIG. 6C, the image data corresponding to the pixels P(e~e+f, g) can be made to be at a different level from the image data of the normal pixels by calculating the average level of the image data for (f+1) lines as shown in FIG. 6B; hence, the line-shaped image defect can be easily detected by comparing the obtained average level with the threshold value for low level region TBL and the threshold value for high level region TBH which are determined in accordance with the average level of the image data for plural lines, and judging whether the obtained average level is within the range from the threshold value for low level region TBL to the threshold value for high level region TBH or not. Further, also by judging whether the obtained average value is within the predetermined range with regard to the average level of the image data for the pixels adjacent to the line e or to the line (e+f) or not, the line-shaped image defect can be detected. Thus, if the obtained average level is judged as an image defect, the (f+1) pixels in longitudinal direction, that is, the pixels P(e~e+f, g) are judged as defective pixels, and the information indicating the positions of the pixels P(e~e+f, g) is memorized in the defect information memory section 26.

Figure 7:
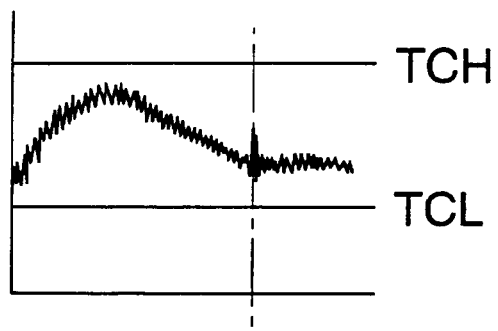
FIGS. 7(A) and 7(B) are drawings for illustrating trend removal.
Figure 7:
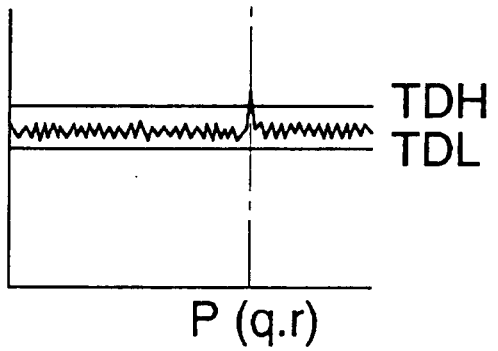

In the case where the histogram of the image data read out from the image memory section 20 has a broad width, that is, as shown in FIG. 7A for example, the signal level of the image data for one line SDC extends to a wide range, the image defect of the pixel P(q, r) can not be detected by merely comparing the image data read out from the image memory section 20 with the threshold value TCL and the threshold value TCH. Therefore, trend removal, which is a process of eliminating a uniform inclination and low frequency component of the variation, is carried out, and by using the above-described first to third method of detecting an image defect, the detection of an image defect can be correctly performed.

As an example of this trend removal, high frequency component of the variation of the image data for one line is removed by smoothing, and through subtraction [or division] of the original image data by the image data obtained by smoothing, the image data having only the high frequency component HSDC with low frequency component removed are generated as shown in FIG. 7B.

Figure 8:
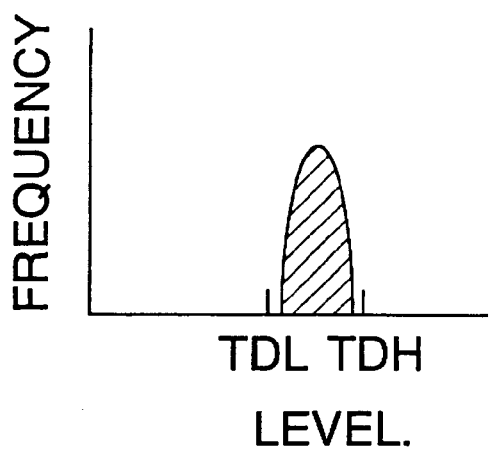
FIG. 8 is a drawing for illustrating the method of determining the threshold values when trend removal is carried out.

Further, in the case where trend removal is carried out, the width of the histogram of the normal image data becomes narrower in comparison with the histogram in FIG. 4 as shown by the oblique lines in FIG. 8. Owing to this, the width from the threshold value for low level region TDL to the threshold value for high level region TDH can be determined to a narrower range than that before carrying out trend removal; hence, the detection of an image defect can be performed with a high precision. Moreover, it is a matter of course that an image defect can be detected, by carrying out the above-described second and third methods of detecting an image defect using the image data HSDC.

In this way, when an image defect is detected in the defect detecting section 24, the information FD indicating the position of the image defect is memorized in the defect information memory section 26. At this time, as the information FD indicating the position of an image defect, for example, the address of the pixel producing the image defect is memorized in the defect information memory section 26. Further, it may be appropriate to memorize the information FD indicating the position of the image defect in a map format in the defect information memory section 26. That is, it may be appropriate that a memory area corresponding to pixels for one field is provided in the defect information memory section 26, and when an image defect is detected, the proper data values are written at the position in the memory area corresponding to the position of the pixel producing this image defect. For example, it is possible to make the signal level of a normal pixel '1' and that of a defective pixel '0'.

In the defect correcting section 28, the positions of image defects are discriminated by reading out the information of image defects FD memorized in the defect information memory section 26, and the correction of the image data of this discriminated image defects are to be carried out. At this time, if the addresses of the pixels producing image defects are memorized as the information indicating the positions of the image defects, the positions of the image defects are discriminated by reading out the memorized addresses successively. On the other hand, in the case where the information indicating the positions of image defects is memorized in a map format in the defect information memory section 26, it can be judged whether a pixel is defective or not by detecting the data values in the memory area successively on the basis of the predetermined value for a defective pixel.

Figure 9:
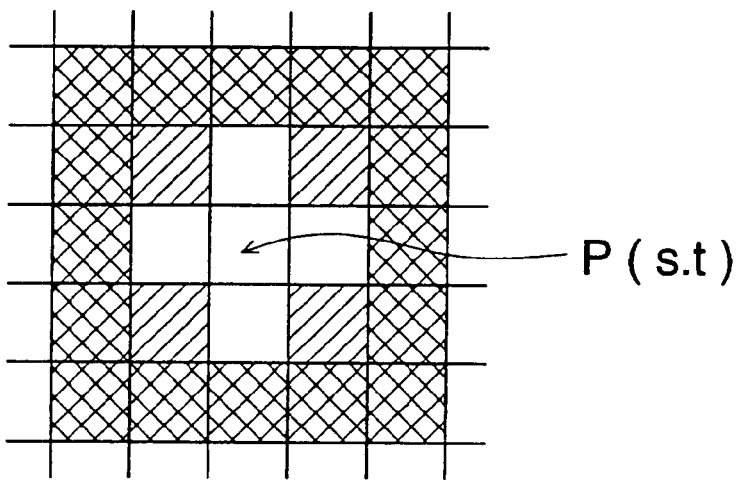
FIGS. 9(A) and 9(B) are drawings for illustrating the method of correcting the image data of a defective pixel.
Figure 9:
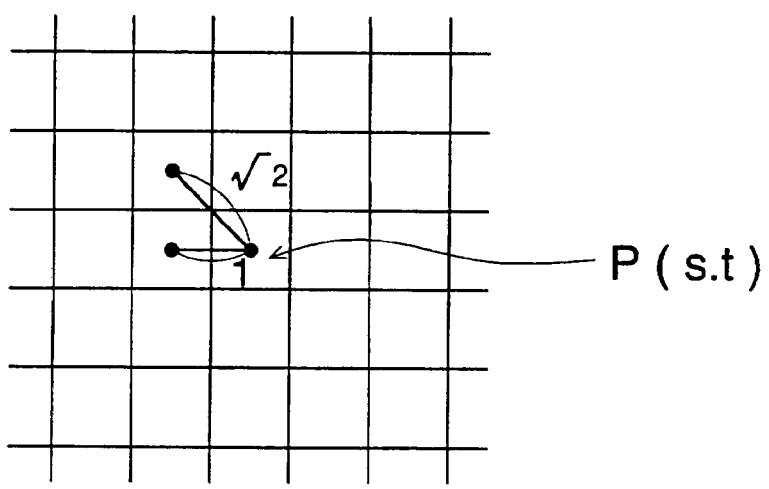

When the position of an image defect is discriminated by this defect correcting section 28, the image data of the normal pixels surrounding the pixel producing the image defect are read out from the image memory section 20, and the correction is carried out by using these read out image data. As an example of the correcting method, there is one wherein the average level of the image data of the normal pixels is made to be the image data of the defective pixel. As shown in FIG. 9A, if the pixels surrounding the pixel P(s, t) producing an image defect are normal, the average level of the image data of the four pixels which are adjacent to the pixel P(s, t) in the upper and lower direction and in the left and right direction, of the eight pixels with the four pixels in the oblique directions shown by the oblique lines added to it, or of the 16 pixels including also the sections shown by hatching are calculated, and this average level is made to be the image data of the pixel P(s, t) after the correction.

Further, in correcting the image defect, it is also possible that weighting for the image data of each pixel is made on the basis of the distance from the pixel P(s, t) to it, and the average level of the weighted image data is made to be the image data after the correction. As shown in FIG. 9B for example, because the distance from the center of the pixel P(s, t) to the center of an adjacent pixel in oblique direction becomes '$2^{1/2}$', if the distance from the former to the center of any one of the adjacent pixels in the direction of upper and lower and left and right is let to be '1', weighting is carried out by multiplying the data of the pixels in oblique direction by ($\frac{1}{2}^{1/2}$), and the average level of the weighted image data is made to be the image data after the correction.

Further, the method of correcting an image defect is not limited to one that uses the average level of the surrounding image data as the image data after correction, but it is possible to employ a method wherein the image data obtained by nearest neighbor interpolation, [bellue]-spline interpolation, linear interpolation, cubic interpolation, and so forth which are described, for example, in "'Restoring Spline Interpolation of CT Images', IEEE TRANSACTION ON MEDICAL IMAGING VOL. M1-2, No. 3, SEPTEMBER 1983" and "'Cubic Convolution for Digital Image Processing', IEEE TRANSACTION ON ACOUSTICS AND SIGNAL PROCESSING VOL. ASSP-29" are used as the image data after correction.

The image data, which have been obtained in this way, are supplied to the image memory section 20, where they are written in the positions corresponding to the positions of the image defects, or new image data are produced by using the corrected image data and are written in the image memory section 20.

In the following, the operation of a radiation image processing apparatus will be explained. When a radiation image is photographed by using the image sensing panel 11, the not-irradiated image data SDA, the uniformly-irradiated image data SDB, or the through-an-object-irradiated image data SDC are written in the image memory section 20, and the detection of image defects is carried out in the defect detecting section 24, by using the image data which have been written in the image memory section 20.

The above-mentioned detection of image defects may be performed by using any one sort of image data from among the not-irradiated image data SDA, the uniformly-irradiated image data SDB, and the through-an-object-irradiated image data SDC, or may be performed by using a plurality of sorts of image data out of them. Further, it is desirable to use either or both of the not-irradiated image data SDA and the uniformly-irradiated image data SDB as the image data. Further, it is a matter of course to carry out the detection of image defects by using any one of or a plurality of the first to third methods of correcting an image defect described in the foregoing. If an image defect is detected in this defect detecting potion 24, the information FD indicating the position of this image defect is memorized in the defect information memory section 26.

While the information FD indicating the positions of image defects is memorized in the defect information memory section 26, when the through-an-object-irradiated image data SDC is written in the image memory section 20, the image data after correction is generated by calculating the average level etc. using the through-an-object-irradiated image data SDC written in the image memory section 20 on the basis of the information FD indicating the positions of image defects memorized in the defect information memory section 26. The above-mentioned image data generated in this way are written in the positions of the memory section 20 corresponding to the positions of the image defects, or new image data for one field are produced by using the corrected image data and are written in the image memory section 20; thus, correction of the image defects is carried out. By reading out and outputting these corrected image data for one field from the image memory section 20, a good radiation image corrected for the image defects can be obtained rapidly.

Further, if the detection of image defects is carried out every predetermined elapsed time or every predetermined number of times of photographing of radiation image in the defect detecting section 24, a good radiation image can be obtained rapidly even though image defects are increased.

Further, the detection and correction of image defects is not limited to the case where it is carried out by using the image data written in the image memory section 20 from the image generating sections 16, but if the image data of an object which has already been photographed are written in the memory section 20, a good radiation image can be obtained also from the image data of an object which has been already photographed, by performing the detection and correction of image defects as described in the above.

Furthermore, in the above-described embodiment, the detection of image defects is done automatically in the defect detecting section 24, and the information FD indicating the positions of the detected image defects is memorized in the defect information memory section 26; however, it may also be possible a method wherein a photographed image is displayed on the image surface of an image display apparatus, which is not shown in the drawings, and if the user detects an image defect from the displayed photographed image, the position of this detected image defect can be written in the defect information memory section 26 as the information FD. In this case, even if an image defect which is not able to be detected in the defect detecting section 24 is produced, it can be corrected too; hence, a better radiation image can be obtained.

Moreover, in the above-described embodiment, the sensing area of the image sensing panel 11 is divided into a plurality of blocks, and the electrical signals SV are outputted parallel from the respective blocks; however, it is a matter of course that the image sensing panel 11 is not limited to one whose sensing area is divided into a plurality of blocks.

According to this invention, image defects are detected by using the first image data produced from output signals of plural radiation detecting elements which are arranged two-dimensionally, and the defect information indicating the position of these detected image defects is memorized, and for the second image data produced by applying the radiation through an object to be radiographed, the image data of the positions indicated by the memorized defect information are corrected. Therefore, the image defects can be corrected even in the case where the second image data have image defects; hence, a good radiation image can be obtained.

"THE SECOND EMBODIMENT"

Figure 10:
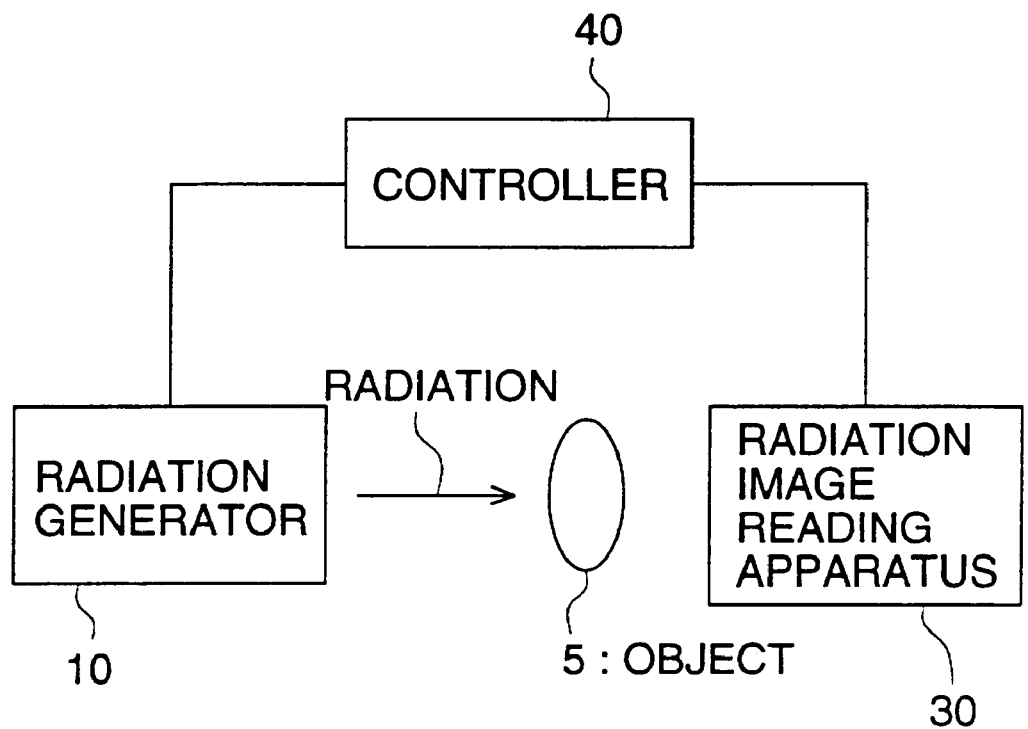
FIG. 10 is a block diagram showing the structure of a radiation image processing apparatus.

In the following, another example of the embodiment of this invention will be explained in detail with reference to the drawings. FIG. 10 is a drawing showing the structure of a radiation image processing apparatus. The radiation generator 10 is controlled by the controller 40. The radiation outputted from this radiation generator 10 is applied to the image sensing panel of the radiation image reading apparatus 30 through an object to be radiographed. In the radiation image reading apparatus 30, the image data based on the intensity of the applied radiation are generated. In the controller 40, the processing, display, or recording of the radiation image is carried out, using the image data generated in the radiation image reading apparatus 30.

Figure 11:
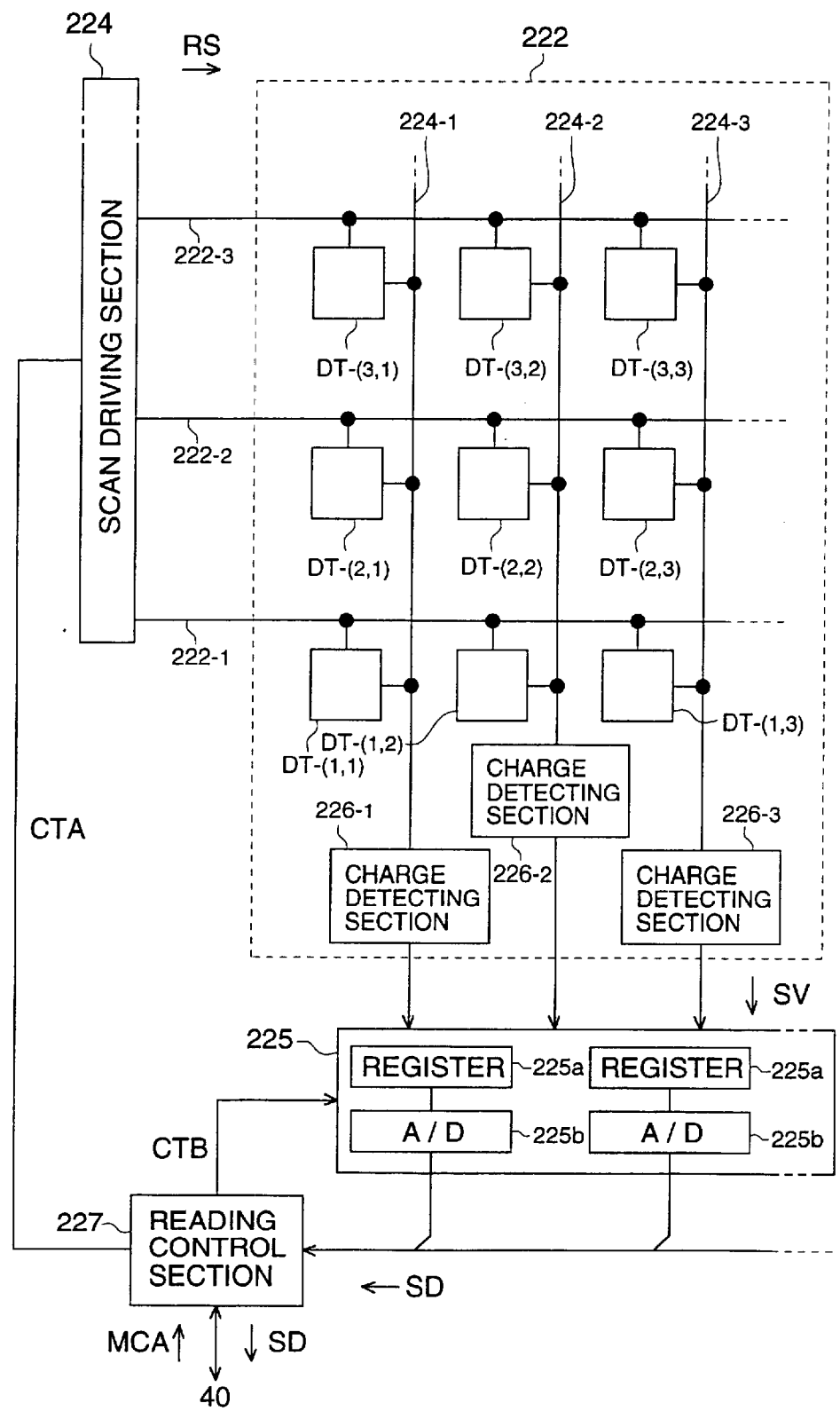
FIG. 11 is a block diagram showing the structure of a radiation image reading apparatus.

FIG. 11 shows the structure of the radiation image reading apparatus 30. In this radiation image reading apparatus 30, the detective elements DT-(1, 1)~DT-(m, n), which output an electrical signal in accordance with the dose of the applied radiation, are arranged two-dimensionally to make up the image sensing panel 222.

As for the detective elements DT described in the above, any one that can output an electrical signal in accordance with the dose of the applied radiation may be employed. For example, in the case where the detective elements are formed by using a photoconductive layer which has its resistance value varied with the generation of the electron-hole pairs when it is irradiated, electric charge of an amount corresponding to the dose of the radiation generated in the photoconductive layer is stored in a charge accumulating capacitor, and this electric charge stored in the charge accumulating capacitor is outputted as an electrical signal. Further, as for the photoconductive layer, one having a high dark resistivity value is desirable; hence, amorphous selenium, lead oxide, cadmium sulfide, mercuric iodide, or an organic material exhibiting photoconductivity (including a photoconductive polymer with an X-ray absorbing compound added) is used, and amorphous selenium is especially desirable.

On the other hand, in the case where the detective elements are formed, for example, by using a scintillator, which emits fluorescent light by the application of radiation or the like, it may be appropriate that an electrical signal based on the strength of the fluorescent light produced by this scintillator is generated in a photodiode and is supplied to the signal selecting section 225. Further, as for the scintillator, $Gd_2O_2S:Tb$, MX:T1 (M=Rb, Cs; X=Cl, Br, I), BaFX:Eu (X=Cl, Br, I), LaOBr:A (A=Tb, Tm), $YTaO_4$, [Y, Sr]$TaO_4$:Nb, and $CaWO_4$, and so forth are used, and among them, $Gd_2O_2S:Tb$, CsI:Tl, and BaFCl:Eu are especially desirable.

Among the detective elements DT of the image sensing panel 222, there are provided the scan lines 222-1 to 222-m and the signal lines 224-1 to 224-n in an orthogonal manner, for example. These scan lines 222-1 to 222-m are connected to the scan driving section 224, where the readout signal RS is generated and outputted to the scan line 222-p (p being any one of the value from 1 to m), which is one of the scan lines 222-1 to 222- m, on the basis of the control signal CTA which is supplied from the reading control section 227 to be described later. Further, the signal lines 224-1 to 224-n are connected to the charge detecting sections 226-1 to 226-n, where the voltage signals SV, each corresponding to the quantity of the electric charge which is read out from the detective elements DT, are generated.

Now, when the electric charge, which has been accumulated in the capacitors in accordance with the dose of the applied radiation, is read out by the readout signal RS from the detective elements DT-(p, 1) to DT-(p, n) connected to the scan lines 222-p, the voltage signals SV-1 to SV-n corresponding to the quantity of the electric charge read out are generated in the charge detecting sections 226-1 to 226-n. These voltage signals SV-1 to SV-n, which have been generated in the charge detecting sections 226-1 to 226-n, are supplied to the signal selecting section 225.

The signal selecting section 225 has a structure with a plurality of registers 225a, and the charge detecting sections 226-1 to 226-n are divided in accordance with the number of the registers 225a so that the voltage signals may be supplied from the predetermined number of the charge detecting sections which are adjacent to one another to any one of the registers. Each of the A/D converters 225b are connected to each of the registers 225a, where the digital image data, for example, of 12 bits or 14 bits are generated by selecting sequentially the supplied voltage signals SV and supplying them to the A/D converters 225b on the basis of the control signal CTB from the reading control section 227 to be described later. These image data for one field SD-(1, 1) to SD-(m, n) generated in the signal selecting sections 225 are supplied to the controller 40 through the reading control section 227.

Further, if the detective elements DT of the image sensing panel 222 are divided into a plurality of blocks and the image data are generated parallel in the respective blocks, the image data for one field SD-(1, 1) to SD-(m, n) can be obtained quickly.

The controller 40 is connected to the reading control section 227, where the various kinds of control signals, for example, the control signals CTA and CTB for carrying out the following operations respectively are generated in synchronism with the operation in the radiation generator 10 on the basis of the control signal MCA from the controller 40: the initializing operation to discharge the stored electric charge from the charge accumulating capacitors of the image sensing panel 222 before the application of radiation, and the process of generating the image data SD through reading out the electric charge which has been stored in the charge accumulating capacitors in accordance with the radiation applied to the image sensing panel 222.

Figure 12:
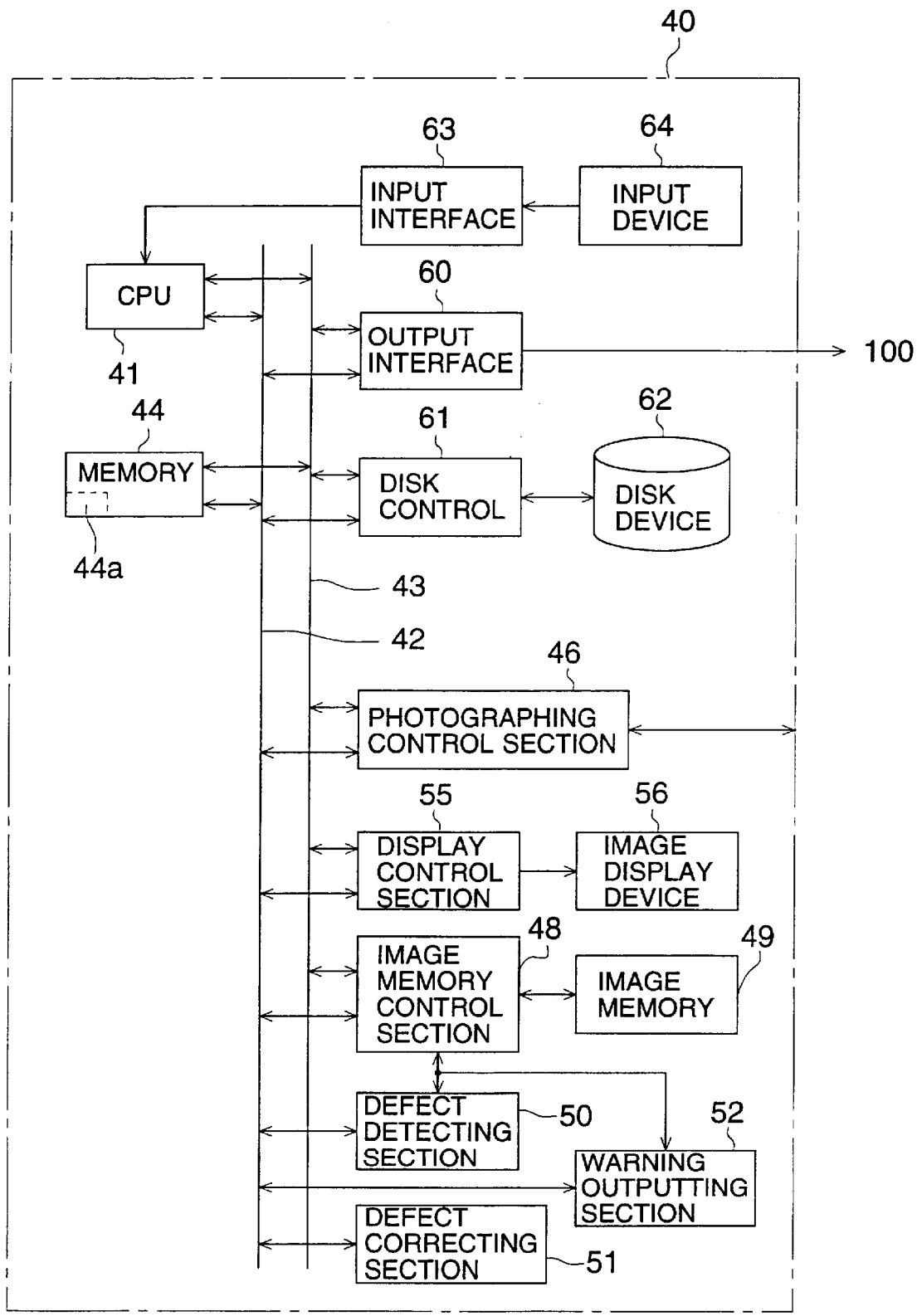
FIG. 12 is a block diagram showing a controller.

FIG. 12 shows the structure of the controller 40; the system bus 42 and the image bus 43 are connected to the CPU (Central Processing Unit) 41 for controlling the operation of the controller 40. Further, the CPU 41 for controlling the operation of the controller 40 executes the operation control on the basis of the control program memorized in the memory 44.

To the system bus 42 and the image bus 43 are connected the following: the memory 44, the photographing control section 46, the image memory control section 48, the display control section 55, the disk control section 61, and the output interface 60; further, to the system bus 42, also the defect detecting section 50, the warning outputting section 51, and the defect correcting section 52 are connected; the operation of each section is controlled by the CPU by utilizing system bus 42, while the transmitting of the image data among the respective sections etc are carried out through the image bus 43. Furthermore, the control of the application of the radiation in the radiation generator 10 and the control of the reading of the radiation image in the radiation image reading apparatus 30 are executed through the photographing control section 46.

The image data SD for one field supplied from the radiation image reading apparatus 30 are memorized in the image memory 49 through the photographing control section 46 and the image memory control section 48. To this memory control section 48, the defect detecting section 50 and the defect correcting section 52 are connected; in the defect detecting section 50, detection of a detective element from which the level of electrical signal is different to that from the other detective elements, that is, detection of an image defect is carried out. Thus, when an image defect is detected in the defect detecting section 50, the information FD indicating the position of the image defect is generated and memorized in the defect information memorizing area 44a of the memory 44.

Now in the CPU 41, the number of the image defects newly obtained by carrying out the defect detecting process in the defect detecting section 50 is compared with the predetermined maximum number of the allowable image defects (hereinafter referred to as 'the maximum allowable number of defects'), and if the number of defects detected by a new defect detecting process exceeds the maximum allowable number of defects, the warning signal ARM is generated and supplied to the warning outputting section 51. Further, the number of the image defects detected by a new defect detecting process is compared with the number of defects based on the defect information FD memorized in the defect information memorizing area 44a of the memory 44, and if the number of the image defects detected by the new defect detecting process is larger, or larger by a predetermined amount, than the number of defects based on the defect information FD memorized in the defect information memorizing area 44a, the warning signal ARM is generated and supplied to the warning outputting section 51. Further, the positions of the image defects detected by a new defect detecting process are compared with the positions of the image defects based on the defect information FD memorized in the defect information memorizing area 44a, and also if the positions of the image defects detected by the new defect detecting process have a new defect position which is different from the defect positions based on the defect information FD memorized in the defect information memorizing area 44a, the warning signal ARM is generated and supplied to the warning outputting section 51.

Further, it has been explained in the above that, the following processes are carried out in the CPU 41: the comparison process between the newly detected number of defects and the maximum allowable number of defects, the comparison process between the newly detected number of defects and the number of defects based on the defect information FD, and the comparison process between the positions of the image defects detected by a new defect detecting process and the positions of the image defects based on the defect information FD; however, it is also possible that any one of these comparison processes or a combination of plural ones of these comparison processes are carried out in the CPU 41.

In the warning outputting section 51, it is notified by a voice on the basis of the warning signal ARM that the number of the defects of the image sensing panel 222 has become larger than the maximum allowable number of defects, the number of the defects has been increased or increased by more than a predetermined value, or some new image defects have been produced. In addition, the warning is not limited to a voice, but it is a matter of course that the display of the warning can be made by utilizing the image display device 56 to be described later.

In the defect correcting section 52, when the image data SD which have been produced by applying the radiation to an object to be radiographed have been written in the image memory 49, the image data of the image defects in the image memory 49 are corrected by using the information FD indicating the positions of the image defects memorized in the defect information memorizing area 44a of the memory 44; thus, new image data for one field are generated and they are memorized in the image memory 49.

The image data memorized in the image memory 49 are read out and supplied to the display control section 55 and the disk control section 61.

The image display device 56 is connected to the display control section 55, and on the image surface of this image display device 56, for example, the radiation image before and after correction and the positions of image defects are displayed on the basis of the image data supplied to the display control section 55 and the information memorized in the defect information memorizing area 44a of the memory 44.

Further, in the case where the number of the available pixels of the image display device 56 is smaller than the number of the pixels of the radiation image reading apparatus 30, by thinning the image data by the CPU 41, the whole photographed image can be displayed on the image surface of the image display device 56. Furthermore, on the condition that the image data of the area corresponding to the available number of pixels of the image display device 56 are read out, the image area at the desired position out of the whole photographed image can be displayed in detail.

At the time of supplying the image data from the image memory 49 to the disk control section 61, for example, the image data are continuously read out and written in the FIFO memory in the disk control section 61, and later, they are sequentially recorded in the disk recording apparatus 62.

Further, it is also possible that the image data read out from the image memory 49 or the image data read out from the disk recording apparatus 62 are supplied to the external apparatus 100 through the output interface 60. In this external apparatus 100, the supplied image data are outputted as a radiation image on a medium such as a photographic film.

Further, the input apparatus 64 such as a keyboard is connected to the CPU 41 through the input interface 63, and photographing, processing, and so forth of a radiation image are carried out by operating the input apparatus 64.

When the processing such as copying, transmitting, and deleting is carried out in the controller 40, the image data before correction supplied from the radiation image reading apparatus 30 and the new image data for one field which have been corrected for the image defects in the defect correcting section 52 are processed as a pair of image data.

Besides, in the above-described embodiment, the operation of the radiation generator 10 and the radiation image reading apparatus 30 is controlled by the controller 40; however, it is possible without doubt that the operation of the radiation image reading apparatus 30 is made to be in synchronism with the radiation generator 10, and when the image data are obtained in the radiation image reading apparatus 30, the image data are to be supplied to the controller 40.

In the following, the operation will be explained. When photographing of a radiation image is carried out, on the condition that the not-irradiated image data SDA, the uniformly-irradiated image data SDB, or the through-an-object irradiated image data SDC are supplied from the radiation image reading apparatus 30 to the controller 40, the detection of image defects is carried out in the defect detecting section 50 of the controller 40.

As for the method of detecting the image defects, the same method as the first—third method of detecting which have been explained in the first embodiment can be employed. Thus, the positional information of the pixels which have been discriminated as the defective pixels producing an image defect is memorized in the defect information memorizing area 44a of the memory 44 as the information indicating the positions of the image defects.

In the case where the histogram of the image data read out from the image memory 49 has a broad width, for example as shown in FIG. 8A, where the signal level of the through-an-object irradiated image data SDC for one line extends to a broad range, the image defect of the pixel P(q, r) can not be detected from merely comparing the image data read out from the image memory 49 with the threshold value TCL and the threshold value TCH. Therefore, by carrying out trend removal, which removes a uniform gradient and the low-frequency component from the image data corresponding to the object to be radiographed, and using the above-described first to third method of detecting an image defect, the detection of the image defects can be performed correctly.

The method of trend removal is the same as explained in the first embodiment.

In this way, when image defects are detected in the defect detecting section 50, the defect information FD indicating the positions and the number of the image defects is memorized in the defect information memorizing area 44a of the memory 44. Further, in detecting the image defects, it may be appropriate to use any one or plural ones of the above-described first to third method of detecting an image defect, or it is possible without doubt to use any other method.

At this time, in the defect information memorizing area 44a, as the information FD indicating the position of an image defect, for example, the address of the pixel producing the image defect is memorized. Further, it may be appropriate to memorize the information FD indicating the positions of image defects in a map format in the defect information memorizing area 44a. That is, it may be appropriate that a memory area corresponding to pixels for one field is provided in the defect information memorizing area 44a, and when an image defect is detected, the proper data value is written at the position in the memory area corresponding to the position of the pixel producing this image defect. For example, it is possible to make the signal level of a normal pixel '1' and that of a defective pixel '0'.

The detection of image defects in this defect detecting section 50 is executed at a predetermined timing, for example, after the passage of definite time, or after photographing of the radiation image has been done a predetermined number of times. Further, in the CPU 41, it is judged whether the number of image defects is larger than the maximum allowable number of defects or not every time when the detection of image defects is done; if the number of image defects is larger than the maximum allowable number of defects, the warning signal ARM is generated. By supplying this warning signal ARM to the warning output section 51, the warning that the number of image defects exceeds the maximum allowable value is given; hence, it can be prevented that a good radiation image becomes incapable of being obtained owing to the increase of defective pixels in the image sensing panel 222.

Furthermore, in the CPU 41, it is judged also whether the number of defects increases to a larger value than the number of image defects based on the defect information memorized in the defect information memorizing area 44a or not. Thus, also when the number of defects gets larger than or gets increased by more than a predetermined amount over the number of image defects based on the defect information memorized in the defect information memorizing area 44a, the warning signal ARM is generated to notify that the number of defects has been increased. Owing to this, it is easily judged the case where the number of defects in the radiation detective elements of the image sensing panel 222 is increased.

Besides, in the CPU 41, it is judged also whether the positions of the image defects, which are detected every time when the detection of the image defects is carried out, include a new defect position which is different from the defect positions based on the defect information memorized in the defect information memorizing area 44a or not. Thus, also when it has been detected the new defect position which is different from the defect positions based on the defect information memorized in the defect information memorizing area 44a, the warning signal ARM is generated to notify that a new image defect has been produced. Owing to this, even if the number of the image defects is not increased in performing a new detection process, it is easily judged that a new image defect has been produced.

Now, in the case where the number of defects becomes larger than or gets increased by more than a predetermined amount over the number of defects based on the defect information FD memorized in the defect information memorizing area 44a, or in the case where it is detected that a new image defect has been produced, it can be correctly detected whether the number of defects is increased or not or whether a new image defect is produced or not, by carrying out the renewal of the defect information through substituting the defect information which has been newly generated in the defect detecting section 50 for the defect information memorized in the defect information memorizing area 44a. Further, the renewal of the defect information is carried out by adding the newly generated defect information to the defect information memorizing area 44a; and by memorizing together the timing of the execution of detecting the image defects, for example, the date and time of the execution at the time of adding the defect information, the correction of the image defects can be made in accordance with the time of photographing of the image data. Owing to this, in the case where a normal pixel has become a defective pixel, it can be prevented that correction is made by misjudging the image data in the state of normal pixel as the image data of a defective pixel.

Figure 13:
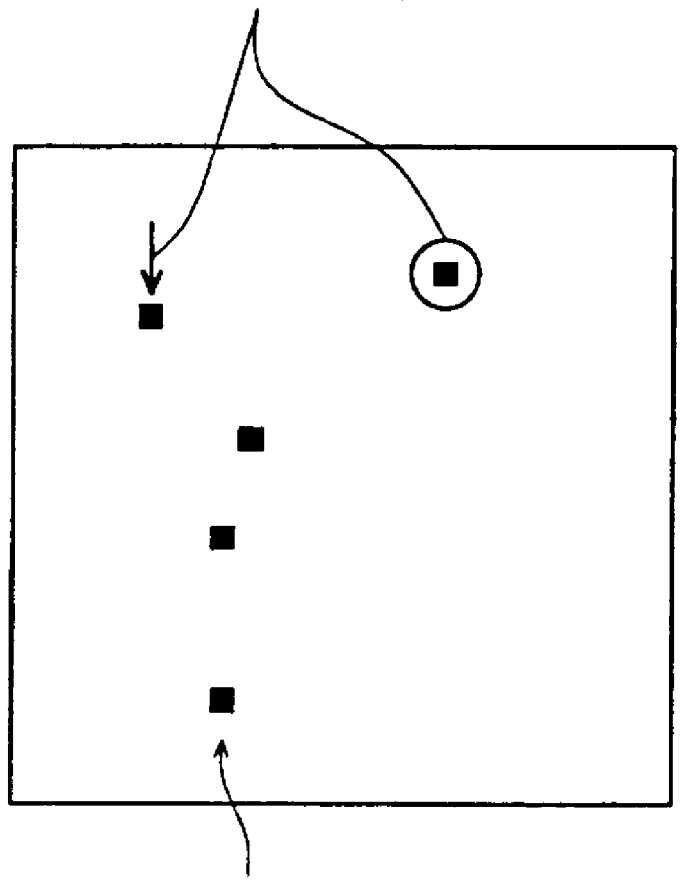
FIG. 13 is an illustration showing the position of image defects displayed on the image display device.

Further, in the case where the position of image defects are displayed on the image display device 56, as shown in FIG. 13, by indicating the positions of the newly detected image defects with a marking, for example, an arrow mark or an encircling mark in order that the positions of the newly detected image defects may be discriminated from the other defect positions, it can be judged easily at which positions the image defects are increased.

Next, when the through-an-object irradiated image data SDC have been written in the image memory 49, correction of the image data at the positions of the image defects is performed in the defect correcting section 52, using the through-an-object irradiated image data SDC written in the image memory 49 on the basis of the defect information FD of the image defects memorized in the defect information memorizing area 44a.

In the defect correcting section 52, the positions of the image defects are discriminated by reading out the defect information of the image defects FD memorized in the defect information memorizing area 44a, and the correction of image data of these discriminated image defects is carried out. This defect information of the image defects FD memorized in the defect information memorizing area 44a is the one to be renewed as described in the foregoing. Now, in the case where the addresses of the pixels producing an image defect are memorized as the information indicating the positions of the image defects, the positions of the image defects can be discriminated by sequentially reading out the memorized addresses. On the other hand, in the case where the defect information of the image defects is memorized in a map format in the defect information memorizing area 44a, it can be judged whether the image data are of an image defect or not by sequentially detecting whether the data values in the memory area are the predetermined value or not. Further, by using the renewed defect information FD, the image defects can be surely discriminated.

When the position of an image defect is discriminated in this defect correcting section 52, the image data of normal pixels adjacent to the pixel producing the image defect are read out from the image memory 49, and the correction is carried out by using these read out image data. As the method of correction, the same method as the one described in the first embodiment can be employed.

As described in the above, in the defect correcting section 52, by using the renewed defect information memorized in the defect information memorizing area 44a of the memory 44, it becomes possible to correct the image defects reliably, and a good radiation image can be obtained.

Further, in the above-described embodiment, it has been explained that the detection of image defects is automatically done in the defect detecting section 50, and the defect information FD of the detected image defects is memorized in the defect information memorizing area 44a; however, it may also be possible a method wherein a photographed image is displayed on the image surface of an image display apparatus, which is not shown in the drawings, and if the user detects an image defect from the displayed photographed image, the position of this detected image defect can be written in the defect information memorizing section 44a as the defect information FD. In this case, even if an image defect which can not be detected in the defect detecting section 50 is produced, correction of the image defects can be performed; hence, a better radiation image can be obtained. Further, if the method of automatic detection of image defects and the method of detecting image defects by the user are executed together, it would be more effective.

The image data for one field after correction obtained in this way is processed together with the image data for one field before correction written in the image memory 49 as a pair. For example, in processing such as copying or transmitting of the image data, the image data before and after correction are handled as a unit of image data. Further, in eliminating the image data, by prohibiting the processing to eliminate only the image data before correcting the image defects, an optimum photographed image can be obtained by carrying out the detection and correction of image defects in various kinds of methods, using the image data before correcting the image defects of which elimination is prohibited. Furthermore, because the image data before correcting the image defects are kept stored, it can be prevented that the positions of pixels which have originally been defective become unknown.

Further, the detection of image defects and the correction of image defects are not limited to the case where the image data written in the image memory 49 are used; however, if the image data of an object which has already been photographed, for example, the image data which have been memorized in a disk unit 62 and so forth, are let to be written in the image memory 49, a good radiation image can be obtained also from the image data of an object which has already been photographed, by performing the detection of image defects and the correction of image defects in the above-described manner.

Further, in the above-described embodiment, it has been explained that the detection of image defects is automatically done in the defect detecting section 50, and the defect information FD of the detected image defects is memorized in the defect information memorizing area 44a; however, it may also be possible a method wherein a photographed image is displayed on the image surface of an image display apparatus, which is not shown in the drawings, and if the user detects an image defect from the displayed photographed image, the position of this detected image defect can be written in the defect information memorizing section 44a as the defect information FD. In this case, even if an image defect which can not be detected in the defect detecting section 50 is produced, correction of the image defects can be performed; hence, a better radiation image can be obtained. Further, if the method of automatic detection of image defects and the method of detecting image defects by the user are executed together, it would be more effective.

Figure 14:
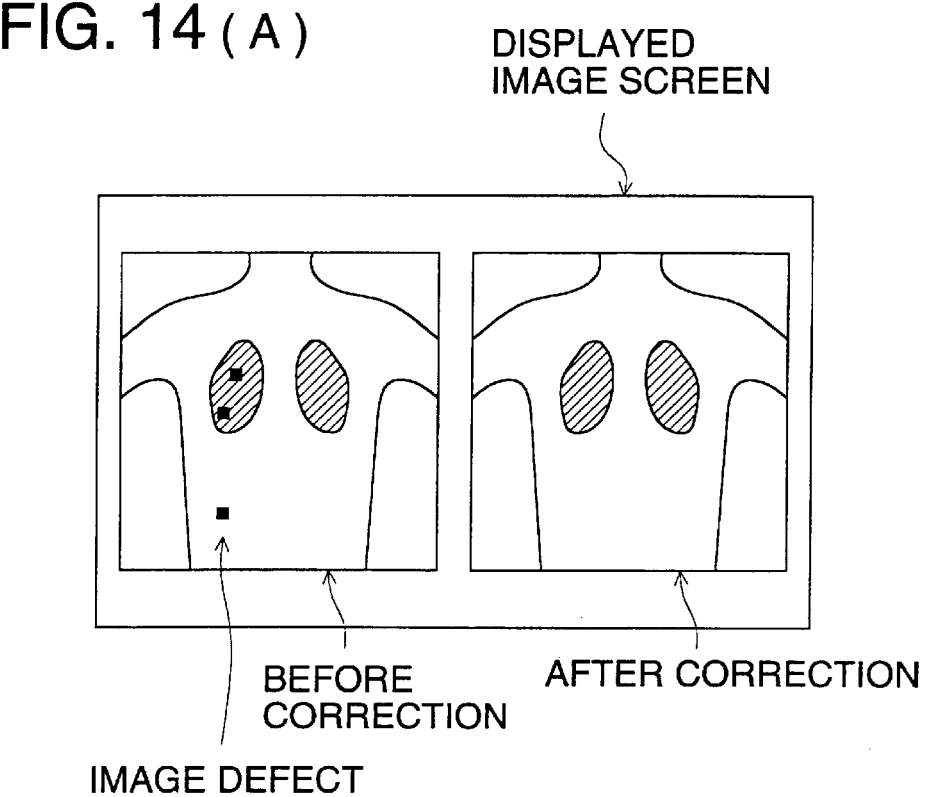
FIGS. 14(A) and 14(B) each is an illustration showing the position of image defects displayed on the image display device.
Figure 14:
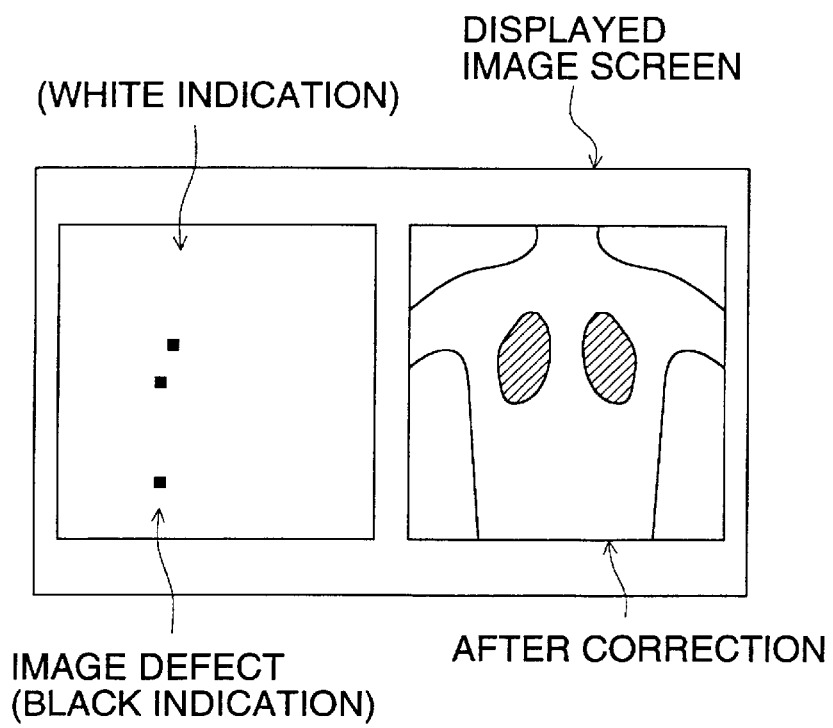

In the controller 40, by supplying the image data before correction and the image data after correction, each for one field, being made as a pair, to the display control section 55, through displaying both the radiation image based on the image data before correction and the radiation image based on the image data after correction simultaneously on the image surface of the image display device 56 as shown in FIG. 14A, not only a good radiation image can be obtained but also the positions of the image defects can be recognized. Further, if the radiation image before correction and the radiation image after correction are displayed alternately, the radiation images can be displayed in a larger size.

Further, by supplying the information memorized in the defect information memorizing area 44a to the display control section 55 and the controller 40, through displaying simultaneously the image based on the image data after correction and the display indicating the positions of the defective pixels on the image surface of the image display device 56 as shown in FIG. 14B, not only a good radiation image can be obtained but also the effect of the correction of the image defects can be easily recognized. Moreover, also in this case, if the radiation image after correction and the positions of the defective pixels are displayed alternately, the radiation image can be displayed in a larger size and the positions of the defective pixels can be more easily recognized.

Further, in indicating the positions of the defective pixels, if the normal pixels are displayed by white or black dots, the positions of the defective pixels can be easily discriminated by reversing the display for the defective pixels.

As described in the above, by making it possible to display the photographed image before correction and the positions of the defective pixels, it can be easily confirmed of which pixel the image data are corrected, and medical doctors can read the photograph grasping the positions of the defective pixels.

Further, in the case where the photographed image is displayed on the image surface with the image data thinned, by displaying the radiation image with the image data at the positions of the image defects eliminated by judging at which positions the image defects are situated on the basis of the defect information memorized in the defect information memorizing area 44a, the number of corrected pixels becomes smaller and a good radiation image can be obtained.

For example, in the case where the image data of (100× 100) pixels are thinned to (1/10) of them, the number of defects is counted using the image data for every 10 pixels from the first pixel on, and next, the number of defects is counted using the image data for every 10 pixels from the second pixels on. Subsequently, the same process is carried out until the number of defects is counted for every 10 pixels from the tenth pixel on; thus, by using the image data for every 10 pixels with a minimum number of defects, a good radiation image can be obtained.

Further, in the case where a plurality of images are displayed on the image surface of the image display device 56, for example, in the case where the radiation image before correction and the radiation image after correction are displayed, if the image data are thinned, the images in which the image data of the same pixel positions for both are eliminated are displayed. In this way, by eliminating the image data of the same pixel positions for both images, it can be obtained a radiation image for which two displayed images are based on the image data of the same pixel positions; hence, the positions of the corrected image defects can be definitely recognized.

Furthermore, in the above-described embodiment, it has been explained the case that the radiation image before the correction for the image defects is displayed together with the radiation image after the correction is done, or the case that the display indicating the positions of image defects and the radiation image after the correction is made are simultaneously displayed together; however, it may be appropriate that the image data of the radiation image before the correction for image defects and the image data of the radiation image after the correction for image defects are supplied from the controller 40 to the external apparatus 100 through the output interface 60, or that the image data indicating the positions of the image defects, which are generated on the basis of the defect information memorized in the defect information memorizing area 44a, and the image data of the radiation image after the correction for the image defects are supplied to the external apparatus 100. In these cases, in the external apparatus 100, the supplied image data are outputted as a radiation image on a medium such as a photographic film. Further, in the case where the image data of the radiation image before the correction for image defects, the image data of the radiation image after the correction for image defects, or the image data indicating the positions of image defects are outputted to the external apparatus 100, it is suitable to output the image data which have been processed in a manner such that it becomes possible to output a radiation image on a single sheet of medium. That is, in the case where the number of pixels to be outputted to a sheet of medium in the external apparatus 100 is smaller than the number of pixels in the image data, it is a matter of course to output the image data of the same pixel positions for every image which are thinned in accordance with the number of pixels which the external apparatus 100 can output.

In addition, in the above-described embodiment, it has been explained the case where the image memory, the defect detecting section, the defect correcting section, and the image display device are provided in the controller 40; however, by providing these in the radiation image reading apparatus 30, it is possible that a good radiation image is displayed and the positions of image defects are made to be capable of being discriminated easily in the radiation image reading apparatus.

Hereinafter, a preferable embodiment will be explained.

Since the data of defect pixels are not right value or deviated from the right value, if an image processing condition is determined based on the data of defect pixels, an inappropriate processing or a wrong processing may be conducted. Then, in the case that the image processing condition for the recognition of the irradiated field or for the recognition of an object to be radiographed is determined based on the data of all pixels or the data of pixels existing in a certain region, it may be preferable not to use the data of the defect pixels or to use the corrected data of the defect pixels. By this manner, the image processing condition can be determined correctly.

Further, it may be preferable that the defect detection is conducted plural times within a short time period with the same sensor so as to obtain defect information and the defect positions are determined based on the defect information in such a manner that the pattern of the defect positions has the high frequency in a plurality of the defect detection or that the defect positions includes all defect positions in the plurality of the defect detection. By this manner, the influence caused by noises can be reduced. That is, when the defect detection is conducted for an image, there may by a possibility that a position having no defect pixel is erroneously deemed as a defect pixel due to some reasons such as the influence of noises or that a defect pixel accidentally indicates a normal value and is not detected as a defect pixel. To counter this situation, it may be preferable to detect defect pixels from the image data obtained from plural images (for example 5 to 10 images) by the same sensor. The positions of defect pixels are finally determined by comparing the positions of defect pixels among the plural sheets in such a method (1) that a defect pixel observed on any one sheet of the plural sheets is deemed as a defect pixel or a method (2) that a defect pixel observed on all sheets of the plural sheets is deemed as a defect pixel. By the method (1), an error to omit a defect pixel may be minimized. In contrast, by the method (2), an error to deem a normal pixel as a defect pixel may be avoided.

Incidentally, when an object is actually radiographed, the object is located roughly at the center of a panel of the sensor in many cases. Therefore, the panel of the sensor is divided into several regions such as a central section and peripheral sections. Then, it may be preferable that increase or decrease in the number of defects is checked for each region. At this check, the check for the central portion is conducted more severely than that for the peripheral sections. As a result of the check, even if the increase in the number of the defects is small, the warning is issued.

Still further, it may be preferable that the size of defect and the shape of the defect are classified into ranks and a table indicating a permissible number of defects predetermined for each rank is prepared. Then, if a number of defects in a certain rank exceeds the permissible number, the warning is issued. Here, the size of defect means the number of defects linked to each other. The shape of defect means the shape of linked defects, such as a line defect in which defects are linked in a line and a square defect in which defects are linked in a square shape. The permissible number of defects are predetermined in the following manner: For example, an isolated single defect may be permissible up to 100 pieces, a square defect formed by four pieces of defects (2×2) may be permissible up to 10 pieces, a line defect in which four pieces of defects are linked may be permissible up to 3 pieces and so on.

Furthermore, it may be considered the following method: Even if a number of each classified defect is within the permissible range respectively, if the total number of defects exceeds a predetermined number, the warning is issued. In this case, when the total number is obtained, there may be a method of providing each defect with a different weight. For example, an isolated single defect is provided with 1 point. Since a square defect formed by four pieces of defects may be deemed as a serious wound, the square defect is provided with 3 points for each one. Since a line defect in which four pieces of defects are linked may be deemed as a more serious wound, the line defect is provided with 10 points for each one. When the total number of points exceeds a predetermined number, the warning is issued.

In addition to the size of defect and the number of defect, the position of defect may be added as a factor. In this case, nearer the position of a defect to the center of the panel, more serious the defect is deemed. Accordingly, a permissible number of the defect becomes smaller and a number of points becomes larger.

Furthermore, it may be preferable to prepare a table in which a judgment whether or not an interpolation is conducted is predetermined in accordance with the size of defect, the shape of defect and the position of defect and to conduct the interpolation in accordance with the table. In this case, the interpolation is conducted basically for all defect and the condition that an interpolation is not conducted is predetermined in the table. For example, when a size of defect is larger than a predetermined size, an interpolation is not conducted for the defect. There may be a risk to overlook a diseased change (a defect) accidentally placed at the position when an interpolation is conducted for a defect larger than the predetermined size. With the above manner, such a risk may be minimized.

Incidentally, it may be preferable that when defects more than a predetermined number are found on a panel of a sensor before the shipment, the sensor is deemed as an inferior article. It may be preferable that the standard regarding a defect locating at a central portion is severer than peripheral portions. Further, in the case that a sensor in which plural panels are jointed is used to detect a single image, it may be preferable to joint panels, for example four sheets of panels such that a number of defects at the central portion of the image is smaller.

According to this invention, because the display of the radiation image or the output of the image data is carried out with the image data of the radiation image before correcting for image defects and the image data of the radiation image after correcting for image defects processed as a pair of data, confirmation of the positions for which correction has been carried out can be made easily. Further, also in the case where the information indicating the positions of image defects is used instead of the image data before correction, confirmation of the positions for which correction has been carried out can be made easily. Further, in the case where the display of the radiation image or the output of the image data is done with the image data thinned, thinning is performed in a manner such that the image defects are reduced to a minimum; hence, a good radiation image with a small number of pixels corrected for defects can be obtained even by using the image data after thinning.

According to this invention, the first set of image defects which has been memorized beforehand and the second set of image defects based on the defect information which has been newly generated in the defect detecting section are compared, and warning is made by a notifying means on the basis of the comparison. Owing to this, the increase in the number of image defects and the generation of new image defects can be easily known; hence, it can be prevented that a good radiation image becomes incapable of being obtained.

Further, when the number of defects in the second set of image defects becomes larger than or gets increased by more than a predetermined amount over the number of defects in the first set of image defects, or when it is detected a new image defect of which the position is different from the positions of the image defects in the first set of image defects, the defect information memorized in the defect information memorizing means is renewed; hence, the situation of generation and increase of defective pixels can be correctly detected.

Furthermore, because each of the positions of the image defects which are newly detected by defect detecting means is displayed on the display means by a marking, it can be easily judged at which positions the image defects have been increasing.

Besides, owing to the use of the renewed defect information, it becomes possible to obtain a good radiation image by correcting the image defects reliably.

What is claimed is:

1. A radiation image processing apparatus, comprising:
   a sensor having plural radiation detecting elements arranged in two dimensions, wherein each of the plural radiation detecting elements is irradiated with radiation, converts the irradiated radiation into an electric image signal, and outputs the electric image signal as an image datum of a single pixel so that the sensor outputs image data corresponding to the plural radiation detecting elements;
   a defect detecting device to receive first image data from a sensor and to detect an image defect caused by a defective element in the first image data and to produce defect information indicating a position of the defective element;

a memory to store the defect information; and a correcting device for receiving second image data outputted from the sensor on a condition that the sensor is irradiated with radiation passing through an object, for correcting the second image data on the basis of the defect information read out from the memory, and for producing third image data.

2. The radiation image processing apparatus of claim 1, wherein the defect detecting device detects the image defect in the first image data by using at least one kind of image data out of image data produced without applying radiation, image data produced with application of a uniform radiation, and image data with application of radiation transmitted through an object to be radiographed as the first image data.

3. The radiation image processing apparatus of claim 1, wherein the defect detecting device detects the image defect in the first image data by using at least one kind of image data out of image data produced without applying radiation and image data produced with application of a uniform radiation as the first image data.

4. The radiation image processing apparatus of claim 1, wherein the defect detecting device conducts one or more of the following plural detecting processes:

(1) a first detecting process wherein a first threshold value and a second threshold value which has a higher level than the first threshold value are determined, and if the level for a certain pixel of the first image data is lower than the first threshold value, or if it is higher than the second threshold value, the pixel is judged as a defective element, (2) a second detecting process wherein if the level for a certain pixel of the first image data is different by more than a predetermined value from the average level of the image data of the surrounding pixels of the pixel, the pixel is judged as a defective element, (3) a third detecting method wherein a third threshold value and a fourth threshold value which has a higher level than the first threshold value are determined, and an average level of the image data of a predetermined number of lines taken in the longitudinal or lateral direction is used as the first image data, and if the average level is lower than the third threshold value, or if it is higher than the fourth threshold value, pixels of the predetermined number of lines are judged as defective elements, and (4) a fourth detecting method wherein an average level of the image data of a predetermined number of lines taken in the longitudinal or lateral direction is used as the first image data, and if the average level is different by more than a predetermined value from the average value of the image data of the surrounding pixels, pixels of the predetermined number of lines are judged as defective elements; and the defect detecting device produces the defect information from the defective elements obtained by the one or plural detecting processes.

5. The radiation image processing apparatus of claim 1, wherein the defect detecting device uses image data subjected to trend removal as the first image data.

6. The radiation image processing apparatus of claim 1, wherein the defect correcting device uses an average level of the image data of the normal pixels surrounding the pixel causing an image defect.

7. The radiation image processing apparatus of claim 6, wherein the defect correcting device uses image data obtained by weighting in accordance with the distance from the pixel causing the image defect to the normal pixels respectively as the image data of the normal pixels.

8. The radiation image processing apparatus of claim 1, wherein the plural elements are radiation detecting elements.

9. The radiation image processing apparatus of claim 1, further comprising:

a processor to correlate the second image data and the third image data.

10. The radiation image processing apparatus of claim 9, wherein the processor processes the second image data and the third image data as a single set of image data.

11. The radiation image processing apparatus of claim 9, wherein the processor prohibits the second image data from being eliminated from the correlated set of the second image data and the third image data.

12. The radiation image processing apparatus of claim 1, further comprising:

a display; and a feeding device to feed the image data to the display;

wherein the feeding device selects one of the second image data and the third image data and feeds the selected one to the display or the feeding device feeds both of the second image data and the third image data.

13. The radiation image processing apparatus of claim 12, wherein the feeding device feeds the defect information indicating the positions of image defects produced on the basis of the defect information stored in the memory to the display together or alternately with one or both of the second image data and the third image data.

14. The radiation image processing apparatus of claim 12, wherein the defect information is image data representing positions of the image defect, the feeding device feeds the second image data, the third image data, and the defect information, all being thinned, to the display, and in thinning the image data, thinning is performed in such a manner as to make the number of the image defects which have been detected by the defect detecting device minimum.

15. The radiation image processing apparatus of claim 14, wherein the feeding device conducts the thinning at the corresponding position in each of the second image data, the third image data and the defect information.

16. The radiation image processing apparatus of claim 1, further comprising:

an image data output device to output the image data, wherein the image data output device outputs the second image data and the third image data into a single sheet of medium.

17. The radiation image processing apparatus of claim 16, wherein the defect information is image data representing positions of image defects and the image data output device outputs the defect information stored in the memory together with one or both of the second image data and the third image data into a single sheet of medium.

18. The radiation image processing apparatus of claim 16, wherein the defect information is image data representing positions of image defect, the feeding device feeds the second image data, the third image data, and the defect information, all being thinned, to the display, and in thinning the image data, thinning is performed in such a manner as to make the number of the image defects which have been detected by the defect detecting device minimum.

19. The radiation image processing apparatus of claim 18, wherein in thinning and outputting the second image data, the third image data and the defect information, the image output device conducts the thinning at the corresponding pixel positions for all groups.

20. The radiation image processing apparatus of claim 1, further comprising:
a defect comparing device to compare predetermined first defect information with second defect information based on new defect information newly produced by the defect detecting device; and
a warning device to produce a warning.

21. A radiation image processing apparatus, comprising:
a sensor in which plural radiation detecting elements are arranged two-dimensionally, to convert irradiated radiation into electric image signals by the plural elements and to output image data in which each element outputs an image datum of a single pixel;
a defect detecting device to receive first image data from the sensor, to detect an image defect caused by a defective element in the first image data, and to produce defect information indicating a position of the defective element;
a memory to store the defect information;
a defect comparing device to compare predetermined first defect information with second defect information based on new defect information newly produced by the defect detecting device; and
a warning device to produce a warning.

22. The radiation image processing apparatus of claim 21, wherein the predetermined first defect information is a predetermined number of image defects, the defect comparing device compares the number of defects of the first defect information and the number of defects of the second defect information, and the warning device produces a warning when the defect comparing device determines that the number of defects of the second defect information is larger than the number of the defects of the first defect information.

23. The radiation image processing apparatus of claim 21, wherein the predetermined first defect information is the number of image defects based on the defect information stored in the memory, the defect comparing device compares the number of defects of the first defect information and the number of defects of the second defect information, and the warning device produces a warning when the defect comparing device determines that the number of defects of the second defect information is larger than the number of the defects of the first defect information, or when the defect comparing device determines that the number of defects of the second defect information exceeds the number of the defects of the first defect information by more than a predetermined value.

24. The radiation image processing apparatus of claim 21, wherein the predetermined first defect information is the positions of image defects based on the defect information stored in the memory, the defect comparing device compares the defect positions of the first defect information and the defect positions of the second defect information, and the warning device makes a warning when it is recognized by the defect comparing device that the defect positions of the second defect information include a new defect position which is different from any one of the defect positions of the first defect information.

25. The radiation image processing apparatus of claim 24, further comprising a display for displaying the positions of image defects based on the defect information which has been newly produced by the defect detecting device, wherein when it is recognized by the defect comparing device that the defect positions of the second defect information include a new defect position which is different from any one of the defect positions of the first defect information, the warning device controls the display to display by marking the new defect position which is different from any one of the defect positions of the first defect information.

26. A radiation image processing apparatus, comprising:
a sensor in which plural elements are arranged two-dimensionally, to convert irradiated radiation into electric image signals by the plural elements and to output image data in which each element outputs an image datum of a single pixel;
a defect detecting device to receive first image data from the sensor, to detect an image defect caused by a defective element in the first image data, and to produce defect information indicating a position of the defective element;
a memory to store the defect information;
a defect comparing device to compare predetermined first defect information with second defect information based on new defect information newly produced by the defect detecting device; and
the memory renewing the stored defect information based on the comparison result by the defect comparing device.

27. The radiation image processing apparatus of claim 26, wherein the defect information stored in the memory is renewed when a new image defect is recognized by the defect comparing device, and the defect comparing device uses the defect information of the image defected based on the defect information which has been renewed by the memory as the first defect information.

28. The radiation image processing apparatus of claim 26, wherein the predetermined first defect information is a predetermined number of image defects, the defect comparing device compares the number of defects of the first defect information with the number of defects of the second defect information, and the memory renews the defect information when the defect comparing device determines that the number of defects of the second defect information is larger than the number of the defects of the first defect information.

29. The radiation image processing apparatus of claim 26, wherein the predetermined first defect information is the number of image defects based on the defect information stored in the memory, and the defect comparing device compares the number of defects of the first defect information with the number of defects of the second defect information, and when the defect comparing device determines that the number of defects of the second defect information is larger than the number of the defects of the first defect information, or when the defect comparing device determines that the number of defects of the second defect information is judged as exceeding the number of the defects of the first defect information, the defect information stored in the memory is renewed, while the defect comparing device uses the defect information of the image defected based on the defect information which has been renewed in the memory as the first defect information.

30. The radiation image processing apparatus of claim 26, wherein the predetermined first defect information is the position of image defects based on the defect information stored in the memory, the defect comparing device compares the defect positions of the first defect information with the defect positions of the second defect information, and when it is recognized by the defect comparing device that the defect positions of the second defect information include a new defect position which is different from any one of the defect positions of the first defect information, the defect information stored in the memory is renewed, while the defect comparing device uses the defect information of the image defects based on the defect information which has been renewed in the memory as the first defect information.

31. The radiation image processing apparatus of claim 26, further comprising:

a defect correcting device for correcting an image defect of image data which have been produced by the image generating means by applying radiation having been transmitted through an object to be radiographed to the plurality of radiation detector elements on the basis of the defect information stored in the memory.

32. A radiation image processing method, comprising steps of:

producing first image data by a sensor which comprises plural radiation detection elements arranged two-dimensionally, converts irradiated radiation into electric image signals by the plural radiation detection elements and outputs image data in which each element outputs an image datum of a single pixel;

producing defect information indicating a position of a defective element by detecting an image defect caused by the defective element in the first image data;

producing second image data by the sensor on a condition that the sensor is irradiated with radiation passing through an object, and producing third image data by correcting the second image data on the basis of the defect information.

33. The radiation image processing method of claim 32, wherein the first image data is at least a kind of image data out of image data produced without applying radiation, image data produced with application of a uniform radiation, and image data with application of radiation transmitted through an object to be radiographed.

34. The radiation image processing method of claim 32, wherein the first image data is at least a kind of image data out of image data produced without applying radiation and image data produced with application of a uniform radiation.

35. The radiation image processing method of claim 32, wherein the image defect is detected by any one or plural detecting processes of the following:

(1) a first detecting process wherein a first threshold value and a second threshold value which has a higher level than the first threshold value are determined, and if the level for a certain pixel of the first image data is lower than the first threshold value, or if it is higher than the second threshold value, the pixel is judged a defective element, (2) a second detecting process wherein if the level for a certain pixel of the first image data is different by more than a predetermined value from the average level of the image data of the surrounding pixels of the pixel, the pixel is judged as a defective element, (3) a third detecting method wherein a third threshold value and a fourth threshold value which has a higher level than the first threshold value are determined, and an average level of the image data of a predetermined number of lines taken in the longitudinal or lateral direction is used as the first image data, and if the average level is lower than the third threshold value, or if it is higher than the fourth threshold value, pixels of the predetermined number of lines are judged as defective elements, and (4) a fourth detecting method wherein an average level of the image data of a predetermined number of lines taken in the longitudinal or lateral direction is used as the first image data, and if the average level is different by more than a predetermined value from the average value of the image data of the surrounding pixels, pixels of the predetermined number of lines are judged as defective elements; and the defect information is produced from the defective elements obtained by the one or plural detecting processes.

36. The radiation image processing method of claim 32, wherein the first image data is image data after trend removal is performed.

37. The radiation image processing method of claim 32, wherein for the correction of an image defect, an average level of the image data of normal pixels surrounding the pixel producing the image defect is used.

38. The radiation image processing method of claim 37, wherein the image data of the normal pixels are image data obtained by weighting in accordance with the distance from the pixel producing the image defect to the normal pixels respectively.

39. The radiation image processing method of claim 32, wherein the plural elements are radiation detecting elements.

40. The radiation image processing apparatus of claim 2, wherein the defect detecting device uses image data produced without applying radiation as the first image data.

41. The radiation image processing apparatus of claim 12, wherein the feeding device can feed the second image data and the third image data to the display and the display can indicate simultaneously both an image corresponding to the second image data and an image corresponding to the third image data.

42. The radiation image processing apparatus of claim 1, wherein the defect information is image data representing positions of the image defect, further comprising:

a processor to correlate the defect information and the third image data.

43. The radiation image processing apparatus of claim 1, wherein the defect information is image data representing positions of the image defect, further comprising:

a display; and a feeding device to feed the image data to the display, wherein the feeding device selects one of the defect information and the third image data and feeds the selected one to the display or the feeding device feeds both of the defect information and the third image data to the display.

44. The radiation image processing apparatus of claim 1, further comprising:

an image data output device to output image data;

wherein the image data output device conduct processing so as to make it possible to output the second image data and the third image data into a single sheet of medium.

* * * * *